United States Patent
Will et al.

(10) Patent No.: US 9,731,534 B2
(45) Date of Patent: Aug. 15, 2017

(54) AUTOMATED SIMULTANEOUS MULTIPLE ARTICLE SUBLIMATION PRINTING PROCESS AND APPARATUS

(71) Applicant: The Hillman Group, Inc., Cincinnati, OH (US)

(72) Inventors: Gary Edward Will, Gold Canyon, AZ (US); Mark Leslie Tarter, Mesa, AZ (US); Bryan Keith Solace, Chandler, AZ (US); James Francis Huss, Scottsdale, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 1056 days.

(21) Appl. No.: 13/951,196

(22) Filed: Jul. 25, 2013

(65) Prior Publication Data
US 2015/0032528 A1   Jan. 29, 2015

(51) Int. Cl.
B41F 16/00 (2006.01)
B41F 16/02 (2006.01)
(Continued)

(52) U.S. Cl.
CPC ......... B41M 5/382 (2013.01); B41F 16/0046 (2013.01); B41J 2/32 (2013.01);
(Continued)

(58) Field of Classification Search
None
See application file for complete search history.

(56) References Cited

U.S. PATENT DOCUMENTS 4,059,471 A   11/1977   Haigh
4,174,250 A   11/1979   Durand
(Continued)

FOREIGN PATENT DOCUMENTS

DE   10 1011 012833 A1   9/2012
EP   2000303   10/2008
(Continued)

OTHER PUBLICATIONS

Non-final Office Action dated Jun. 19, 2015, issued in U.S. Appl. No. 13/951,150, filed Jul. 25, 2013, (9 pages).
(Continued)

*Primary Examiner* — Huan Tran
(74) *Attorney, Agent, or Firm* — Finnegan, Henderson, Farabow, Garrett & Dunner, LLP

(57) ABSTRACT

A process and apparatus for sublimating printed images onto two or more products substantially simultaneously are disclosed. Software components are configured to receive input of a desired number of products to sublimate, and then determine a spatial arrangement of the printed images on transfer media to sublimate the desired number of products substantially simultaneously. The apparatus is configured to print the images onto the media according to the spatial arrangement, then position the media onto a substrate. The products are automatically placed on the media proximate to their corresponding printed images. The apparatus manipulates the media to substantially surround the products and places at least one image onto each side of each product to be sublimated. One or more heating platens engage the media to sublimate the images. The heating platens are configured, using a control, to sublimate multiple products substantially simultaneously in a single thermal cycle.

39 Claims, 11 Drawing Sheets

(51) Int. Cl.
  *B41M 5/035*    (2006.01)
  *B41M 5/382*   (2006.01)
  *G06Q 30/02*    (2012.01)
  *B44C 1/16*     (2006.01)
  *G07F 11/70*    (2006.01)
  *B41J 2/32*     (2006.01)
  *G07F 17/26*    (2006.01)

(52) U.S. Cl.
  CPC .......... *B44C 1/16* (2013.01); *G06Q 30/0226* (2013.01); *G07F 11/70* (2013.01); *G07F 17/26* (2013.01); *B41F 16/00* (2013.01); *B41F 16/02* (2013.01); *B41M 5/38221* (2013.01)

(56) References Cited

U.S. PATENT DOCUMENTS

| | | |
|---|---|---|
| 4,202,663 A | 5/1980 | Haigh et al. |
| 4,242,092 A | 12/1980 | Glover |
| 4,253,838 A | 3/1981 | Mizuno et al. |
| 4,314,814 A | 2/1982 | Deroode |
| 4,465,728 A | 8/1984 | Haigh et al. |
| 4,662,966 A | 5/1987 | Sumi et al. |
| 4,664,672 A | 5/1987 | Krajec et al. |
| 4,670,084 A | 6/1987 | Durand |
| 4,933,315 A | 6/1990 | Kanto et al. |
| 4,943,555 A | 7/1990 | Nakamoto et al. |
| 4,990,485 A | 2/1991 | Egashira et al. |
| 5,122,499 A | 6/1992 | Janssens et al. |
| 5,135,905 A | 8/1992 | Egashira et al. |
| 5,202,176 A | 4/1993 | Higuchi et al. |
| 5,244,234 A | 9/1993 | Oshima et al. |
| 5,246,518 A | 9/1993 | Hale |
| 5,248,363 A | 9/1993 | Hale |
| 5,252,530 A | 10/1993 | Nakamura |
| 5,254,523 A | 10/1993 | Fujimura et al. |
| 5,302,223 A | 4/1994 | Hale |
| 5,308,426 A | 5/1994 | Claveau |
| 5,344,807 A | 9/1994 | Nakamura |
| 5,346,877 A | 9/1994 | Nakamura |
| 5,354,401 A | 10/1994 | Asahi et al. |
| 5,431,501 A | 7/1995 | Hale et al. |
| 5,432,145 A | 7/1995 | Oshima et al. |
| 5,468,714 A | 11/1995 | Oshima et al. |
| 5,487,614 A | 1/1996 | Hale |
| 5,488,907 A | 2/1996 | Xu et al. |
| 5,522,317 A | 6/1996 | Hale et al. |
| 5,546,316 A | 8/1996 | Buckley et al. |
| 5,550,098 A | 8/1996 | Aso et al. |
| 5,555,813 A | 9/1996 | Hale et al. |
| 5,574,829 A | 11/1996 | Wallace et al. |
| 5,575,877 A | 11/1996 | Hale et al. |
| 5,580,410 A | 12/1996 | Johnston |
| 5,590,600 A | 1/1997 | Hale et al. |
| 5,601,023 A | 2/1997 | Hale et al. |
| 5,623,581 A | 4/1997 | Attenberg |
| 5,630,894 A | 5/1997 | Koch et al. |
| 5,634,731 A | 6/1997 | Kita et al. |
| 5,640,180 A | 6/1997 | Hale et al. |
| 5,642,141 A | 6/1997 | Hale et al. |
| 5,643,387 A * | 7/1997 | Berghauser ............ B41M 5/035 156/230 |
| 5,644,988 A | 7/1997 | Xu et al. |
| 5,734,396 A | 3/1998 | Hale et al. |
| 5,830,263 A | 11/1998 | Hale et al. |
| 5,959,278 A | 9/1999 | Kobayashi et al. |
| 5,962,368 A | 10/1999 | Poole |
| 5,997,677 A | 12/1999 | Zaher |
| 6,103,041 A | 8/2000 | Wagner et al. |
| 6,105,502 A | 8/2000 | Wagner et al. |
| 6,110,316 A | 8/2000 | Kobayashi et al. |
| 6,118,545 A | 9/2000 | Kawai et al. |
| 6,149,754 A | 11/2000 | Ogata et al. |
| 6,165,938 A | 12/2000 | Narita et al. |
| 6,249,297 B1 | 6/2001 | Lion |
| 6,341,856 B1 | 1/2002 | Thompson et al. |
| 6,344,103 B1 | 2/2002 | Cheng et al. |
| 6,348,939 B1 | 2/2002 | Xu et al. |
| 6,392,680 B2 | 5/2002 | Akada et al. |
| 6,402,313 B1 | 6/2002 | Xu et al. |
| 6,425,331 B1 | 7/2002 | Xu et al. |
| 6,439,710 B1 | 8/2002 | Hale et al. |
| 6,447,629 B1 | 9/2002 | Thompson et al. |
| 6,450,098 B1 | 9/2002 | Hale et al. |
| 6,474,230 B2 | 11/2002 | Corrado |
| 6,486,903 B1 | 11/2002 | Wagner et al. |
| 6,488,370 B2 | 12/2002 | Hale et al. |
| 6,535,791 B1 | 3/2003 | Wang |
| 6,540,345 B1 | 4/2003 | Wagner et al. |
| 6,618,066 B2 | 9/2003 | Hale et al. |
| 6,623,677 B1 | 9/2003 | Smith et al. |
| 6,631,984 B2 | 10/2003 | Thompson et al. |
| RE38,295 E | 11/2003 | Kobayashi et al. |
| 6,649,317 B2 | 11/2003 | Wagner et al. |
| 6,673,503 B2 | 1/2004 | Wagner et al. |
| 6,686,314 B2 | 2/2004 | Xu et al. |
| 6,814,831 B2 | 11/2004 | Drake |
| 6,816,752 B1 | 11/2004 | Wang |
| 6,840,614 B2 | 1/2005 | Wagner et al. |
| 6,849,370 B2 | 2/2005 | Wagner et al. |
| 6,887,640 B2 | 5/2005 | Zhang et al. |
| 6,961,076 B2 | 11/2005 | Wagner et al. |
| 6,966,643 B2 | 11/2005 | Hale et al. |
| RE38,952 E | 1/2006 | Hale et al. |
| 6,998,005 B2 | 2/2006 | Magee et al. |
| 7,001,649 B2 | 2/2006 | Wagner et al. |
| 7,041,424 B2 | 5/2006 | Xu et al. |
| 7,137,426 B2 | 11/2006 | Neri et al. |
| 7,154,630 B1 | 12/2006 | Nimura et al. |
| 7,156,566 B2 | 1/2007 | Johnson et al. |
| 7,166,191 B2 | 1/2007 | Suzuki et al. |
| 7,212,308 B2 | 5/2007 | Morgan |
| 7,267,737 B2 | 9/2007 | Neri et al. |
| 7,524,048 B2 | 4/2009 | Xu |
| 7,527,655 B1 | 5/2009 | Wagner et al. |
| 7,563,341 B2 | 7/2009 | Ferguson et al. |
| 7,654,660 B2 | 2/2010 | Hale et al. |
| 7,810,538 B2 | 10/2010 | Magee et al. |
| 7,870,824 B2 | 1/2011 | Helma et al. |
| 8,029,883 B2 | 10/2011 | Xu et al. |
| 8,268,546 B2 | 9/2012 | Kobayashi et al. |
| 8,283,290 B2 | 10/2012 | Langan et al. |
| 8,308,891 B2 | 11/2012 | Drake et al. |
| 8,337,006 B2 | 12/2012 | Hale et al. |
| 8,343,574 B2 | 1/2013 | Downs et al. |
| 8,349,114 B2 | 1/2013 | Green |
| 8,387,673 B2 | 3/2013 | Spengler |
| 8,398,224 B2 | 3/2013 | Hale et al. |
| 8,400,485 B2 | 3/2013 | Hirota |
| 8,405,694 B2 | 3/2013 | Hsu et al. |
| 8,425,029 B2 | 4/2013 | Xu |
| 2002/0066378 A1 | 6/2002 | Almblad et al. |
| 2004/0050279 A1 | 3/2004 | Ibarra et al. |
| 2004/0143914 A1 | 7/2004 | Flaherty |
| 2005/0070434 A1 | 3/2005 | Drake |
| 2005/0150591 A1 * | 7/2005 | Goertzen ............. B44C 1/1716 156/230 |
| 2005/0248649 A1 | 11/2005 | Farrell et al. |
| 2006/0159851 A1 * | 7/2006 | Tomasella .................. B41J 3/44 427/258 |
| 2007/0181253 A1 | 8/2007 | Xu et al. |
| 2007/0213216 A1 | 9/2007 | Lindemann et al. |
| 2008/0095940 A1 | 4/2008 | Lee et al. |
| 2010/0129621 A1 | 5/2010 | Langan et al. |
| 2010/0266817 A1 | 10/2010 | Hirst |
| 2011/0111188 A1 | 5/2011 | Xu et al. |
| 2011/0180202 A1 | 7/2011 | Hirst et al. |
| 2012/0044312 A1 | 2/2012 | Hirst |
| 2012/0219652 A1 | 8/2012 | Simons |
| 2012/0297041 A1 | 11/2012 | Momchilov |
| 2012/0301122 A1 | 11/2012 | Chao et al. |
| 2012/0320136 A1 | 12/2012 | Xu |
| 2012/0327257 A1 | 12/2012 | O'Keefe et al. |
| 2013/0045341 A1 | 2/2013 | Ramsden |

(56) References Cited

U.S. PATENT DOCUMENTS

| | | |
|---|---|---|
| 2015/0028094 A1 | 1/2015 | Will et al. |
| 2015/0029285 A1 | 1/2015 | Will et al. |
| 2015/0029288 A1 | 1/2015 | Will et al. |
| 2015/0029289 A1 | 1/2015 | Rosner et al. |

FOREIGN PATENT DOCUMENTS

| | | |
|---|---|---|
| GB | 2 130 144 A | 5/1984 |
| WO | WO 96/06729 A1 | 3/1996 |
| WO | WO 97/09180 A1 | 3/1997 |
| WO | WO 00/07822 A1 | 2/2000 |
| WO | WO 2005/105470 | 11/2005 |
| WO | WO 2008/144839 | 12/2008 |
| WO | WO 2009/053721 A1 | 4/2009 |
| WO | WO 2011/003125 | 1/2011 |
| WO | WO 2011/039785 | 4/2011 |
| WO | WO 2012/141985 A1 | 10/2012 |

OTHER PUBLICATIONS

Non-final Office Action dated Sep. 21, 2015, issued in U.S. Appl. No. 14/261,202, filed Apr. 24, 2014, (18 pages).
European Patent Office, International Search Report for PCT Application No. PCT/US2014/047527, Feb. 12, 2015, 3 pages.
European Patent Office, Written Opinion of the International Searching Authority for PCT Application No. PCT/US2014/047527, Feb. 12, 2015, 7 pages.
European Patent Office, International Search Report for PCT Application No. PCT/US2014/045719, Feb. 13, 2015, 3 pages.
European Patent Office, Written Opinion of the International Searching Authority for PCT Application No. PCT/US2014/045719, Feb. 13, 2015, 9 pages.
European Patent Office, International Search Report for PCT Application No. PCT/US2014/047142, Feb. 19, 2015, 3 pages.
European Patent Office, Written Opinion of the International Searching Authority for PCT Application No. PCT/US2014/047142, Feb. 19, 2015, 9 pages.
Office Action, U.S. Appl. No. 13/951,127, Mar. 17, 2015, 7 pages.
European Patent Office, International Search Report for PCT Application No. PCT/US2014/047396, Dec. 16, 2014, 6 pages.
European Patent Office, Written Opinion of the International Searching Authority for PCT Application No. PCT/US2014/047396, Dec. 16, 2014, 7 pages.
European Patent Office, International Search Report for PCT Application No. PCT/US2014/046944, Dec. 15, 2014, 6 pages.
European Patent Office, Written Opinion of the International Searching Authority for PCT Application No. PCT/US2014/046944, Dec. 15, 2014, 9 pages.
"Mug Sublimation," YouTube, http://www.youtube.com/watch?v=XI_DB3TVAws, uploaded Jan. 21, 2008.

* cited by examiner

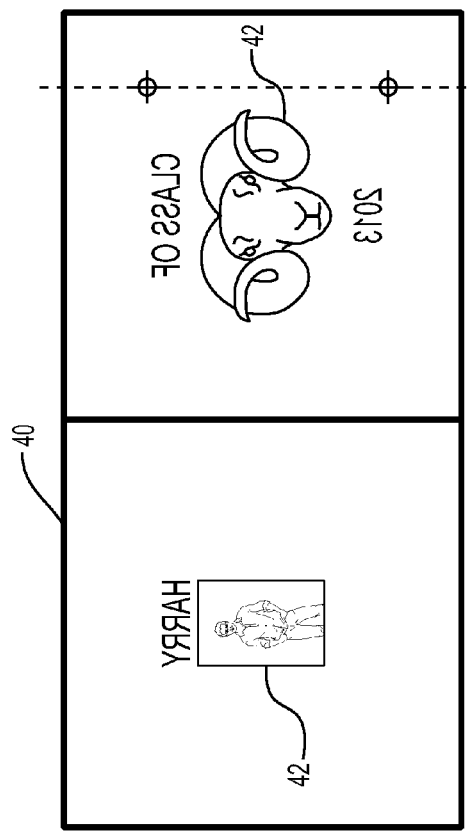
FIG. 4A
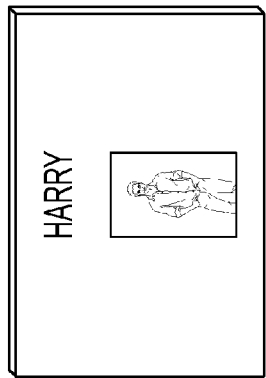
FIG. 4B
FIG. 4C
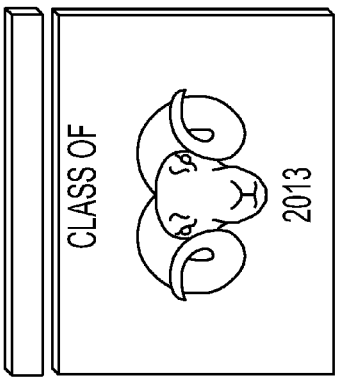
FIG. 4D
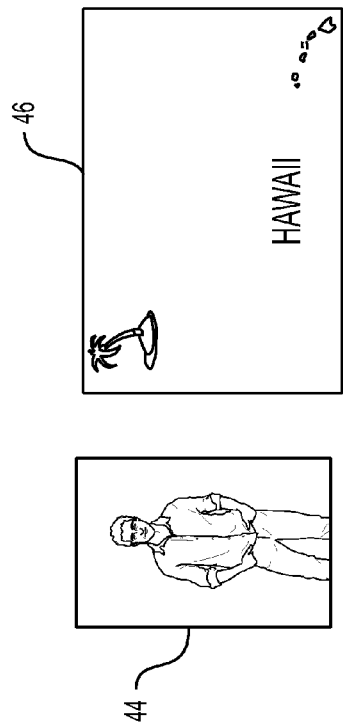
FIG. 4E
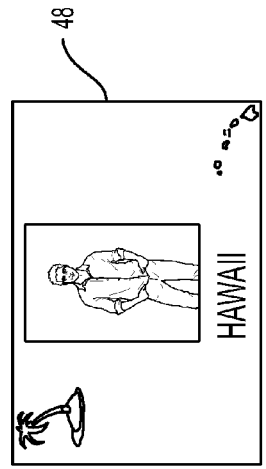
FIG. 4F

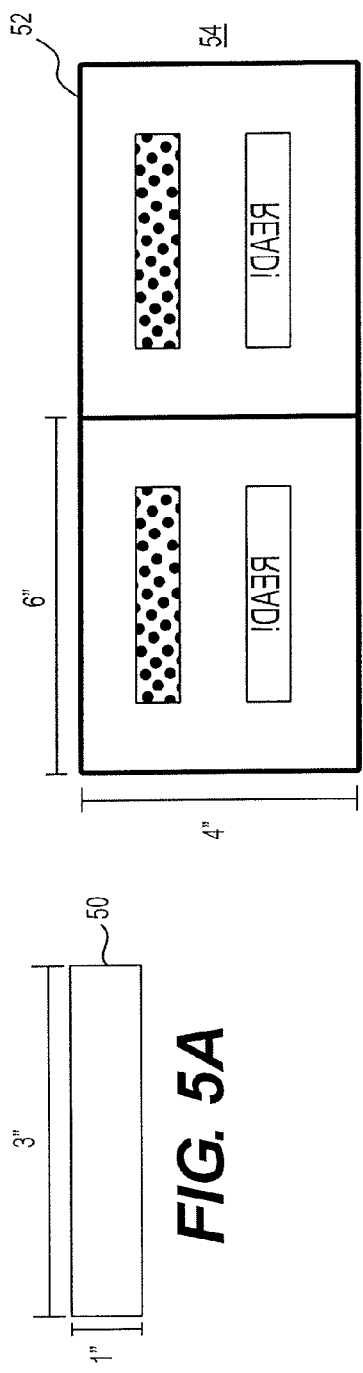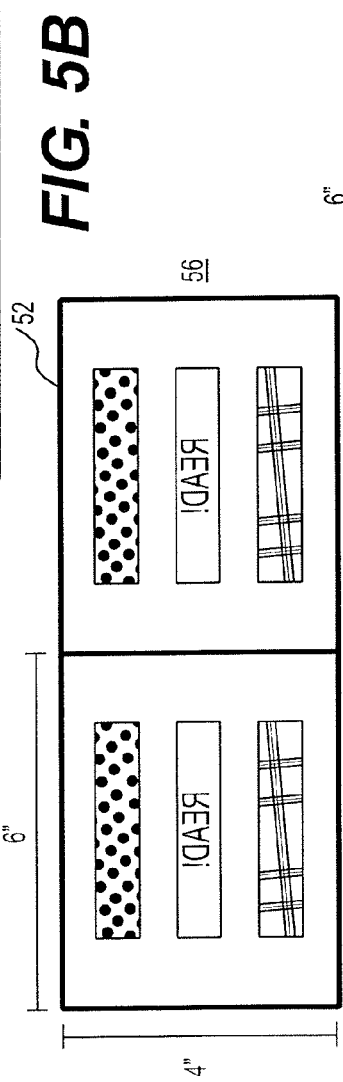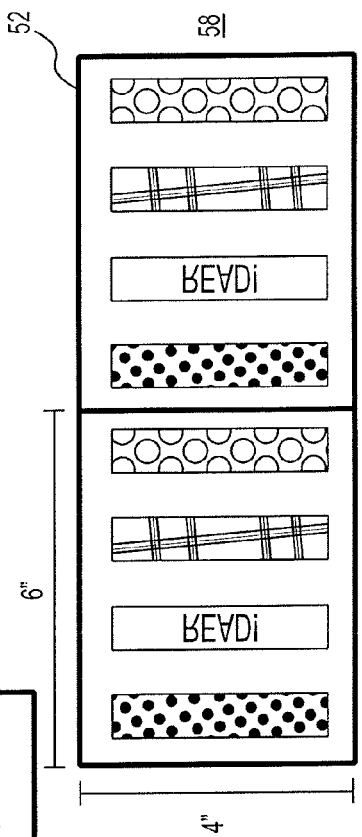

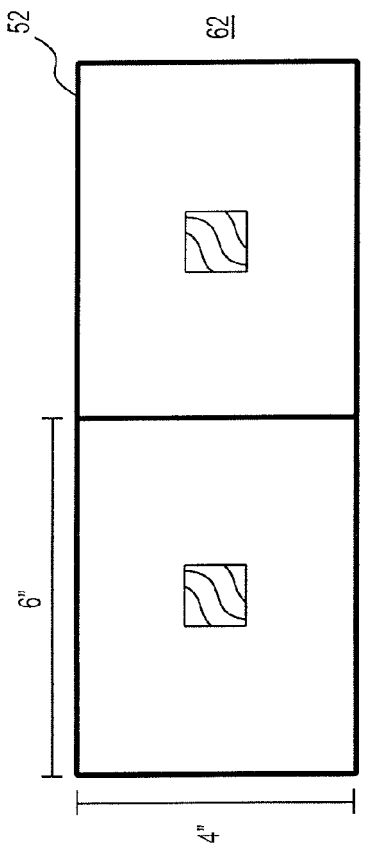
*FIG. 6A*
*FIG. 6B*
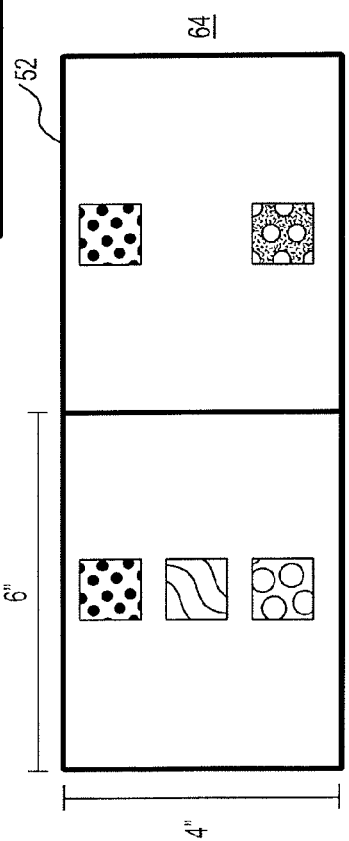
*FIG. 6C*
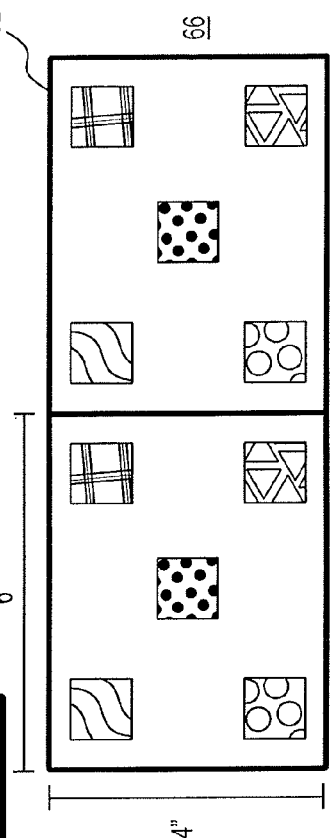
*FIG. 6D*

AUTOMATED SIMULTANEOUS MULTIPLE ARTICLE SUBLIMATION PRINTING PROCESS AND APPARATUS

FIELD

The present disclosure generally relates to dye sublimation transfer printing, and more particularly, to a method and apparatus for sublimating one or more images substantially simultaneously on multiple products capable of incorporating sublimation dye.

BACKGROUND

Dye sublimation is a process employing heat and pressure to convert solid dyes into gaseous form without entering an intermediate liquid phase. Such a process can infuse colored dye into certain compatible materials, such as polyester or ceramics, to create a permanent printed image on the material.

One drawback of current sublimation systems is that many are limited to sublimating a single product at a time. Adding the capability to sublimate multiple images would enhance profit-generating opportunities, increase energy efficiency, and reduce wear on system components. A difficult hurdle to overcome, however, is the minute precision and accuracy required to place and align multiple products onto transfer media in order to receive sublimated images.

One attempt at a dye sublimation printer system capable of sublimating multiple products simultaneously is described in U.S. Patent Publication No. 2005/0248649 (the '649 publication). The '649 publication discloses a dye transfer sublimation system in which images to be sublimated are printed on a "ink transfer substrate" such as a synthetic fabric. An object to be sublimated is placed in a "pressure vessel," the ink transfer substrate is placed on top of the surface of the object, and the printed images are sublimated to the object under high heat and either vacuum or fluid pressure. The '649 publication states that "multiple objects (of the same or different shapes) may also be sublimated concurrently." This concurrent operation is achieved by manually "spacing the objects apart" within the pressure chamber and covering them all with either a single ink transfer substrate or multiple ink transfer substrates.

Although the systems and methods disclosed in the '649 publication may assist an operator in sublimating multiple products simultaneously, the disclosed system is limited. The '649 system does not easily lend itself to streamlined automation, as no integrated system is disclosed, and each of the products and printed ink transfer substrates must be manually placed and aligned within the pressure vessel. Particularly in embodiments of the '649 publication utilizing a fluid pressure sublimation system, it would be difficult if not impossible to align multiple images and products together manually with the desired level of precision and accuracy. The '649 system would also be unsuitable as a system in a retail environment that could be operated by an untrained customer. The '649 system contains significant limitations that would make it unsuitable for a merchant, such as a retail outlet, seeking to add a dye sublimation system capable of sublimating multiple products simultaneously at the demand of a customer.

Retailers seeking to deploy a dye sublimation transfer printing system are currently forced to select either systems that can only sublimate a single product at a time, or systems that can only sublimate multiple products after manual alignment in an error-fraught process requiring trial and error experimentation. Consequently, retailers are limited in revenue-generating capability, and also are unable to offer a full array of pricing options based on the efficiencies created by the disclosed system.

The disclosed system is directed to overcoming one or more of the problems set forth above and/or elsewhere in the prior art.

SUMMARY

The present invention is directed to an improved method and apparatus for sublimating multiple products substantially simultaneously. The advantages and purposes of the invention will be set forth in part in the description which follows, and in part will be apparent from the description, or may be learned by practice of the invention. The advantages and purposes of the invention will be realized and attained by the elements and combinations particularly pointed out in the appended claims.

In accordance with one aspect of the invention, a computer-implemented automated method for simultaneously sublimating images on two or more products using a dye sublimation transfer printer apparatus including an interface device containing one or more processors is disclosed. The method comprises prompting the user, via the interface device, to indicate a desired number of products to sublimate. Also, the method includes receiving, via the interface device, one or more digital image files representing an image selected by the user for sublimating onto the products. The method includes presenting to the user, via the interface device, information relating to pricing of the desired products. The method further includes determining, via the one or more processors, a spatial arrangement of the images on a transfer media based upon the user's desired number of products to be sublimated. The method further comprises printing the images onto the transfer media, wherein the images are printed onto the media according to the determined spatial arrangement, and positioning the transfer media on a substrate. Additionally, the method includes positioning the desired number of products onto the transfer media in a manner corresponding to the determined spatial arrangement. The method also includes configuring, via one or more processors, a single thermal cycle for one or more heating platens such that the images will be sublimated substantially simultaneously onto each one of the desired number of products in a single thermal cycle. The method further comprises moving the one or more heating platens into contact with the transfer media. Finally, the method comprises sublimating at least one image from the transfer media onto each of the desired number of products using the configured single thermal cycle of the one or more heating platens.

In another aspect of the invention, a computer-implemented automated method for marketing customized dye sublimation products to a customer using a dye sublimation transfer printer apparatus including an interface device containing one or more processors is disclosed. The method comprises determining, via the one or more processors, pricing information associated with a desired purchase based on predetermined criteria, wherein the criteria include at least one of a type of product desired and a quantity of products desired, and wherein the information includes information relating to a discounted unit price based on sublimating an increased quantity of products. Additionally, the method includes providing the determined pricing information to the customer via the interface device, wherein the pricing information includes the discounted unit price information. Further, the method comprises receiving a second input from the interface device after the pricing information is provided to the customer indicating a quantity of products that the customer desires to sublimate. The method includes receiving an input from the interface device indicating a selection by the customer of one or more images to sublimate onto the desired products. The method further includes determining, via the one or more processors, a spatial arrangement of the images on a transfer media based upon the second customer input indicating a desired number of products to be sublimated. The method further comprises printing the images onto the transfer media, wherein the images are printed onto the media according to the determined spatial arrangement. Additionally, the method includes positioning the desired number of products onto the transfer media in a manner corresponding to the determined spatial arrangement. The method also includes configuring a single thermal cycle for one or more heating platens such that the images will be sublimated substantially simultaneously onto each one of the desired number of products in a single thermal cycle. Additionally, the method comprises sublimating at least one image from the transfer media onto each of the desired number of products substantially simultaneously using the configured single thermal cycle. The method continues by coordinating payment from the customer via the interface device for the products based on the determined pricing information and the quantity of products sublimated. Also, the method includes prompting the customer to determine if additional sublimated products are desired. Finally, the method comprises providing the sublimated products to the customer.

In yet another aspect, the invention is directed to an apparatus for sublimating images onto multiple products for a user in a retail environment. The apparatus comprises a user interface device including one or more processors configured to receive one or more digital image files representing one or more images, wherein the user interface is configured to determine a spatial arrangement of the images on a transfer media based upon the user's desired number of products to be sublimated. The apparatus further comprises a dye sublimation transfer printer configured to print the images on the transfer media according to the determined spatial arrangement. The apparatus further comprises a substrate configured to receive the transfer media from the printer. Also, the apparatus includes a transport mechanism configured to position the multiple products onto the transfer media and manipulate the transfer media to substantially surround the multiple products, wherein at least one printed image is positioned onto at least one side of each of the multiple products to be sublimated. Finally, the apparatus includes one or more heating platens configured to engage the transfer media, and a control unit for configuring a single thermal cycle for the one or more heating platens such that the images will be sublimated substantially simultaneously onto each of the multiple products in a single thermal cycle.

Additional objects and advantages of the invention will be set forth in part in the description which follows, and in part will be apparent from the description, or may be learned by practice of the embodiments. The objects and advantages of the invention will be realized and attained by the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings:

FIGS. 4A-4F are diagrammatic illustrations of customized images produced by an integrated dye sublimation transfer printing vending machine consistent with disclosed embodiments.

FIGS. 5A-5D are diagrammatic illustrations of spatially arranged printed images for sublimation consistent with disclosed embodiments.

FIGS. 6A-6D are diagrammatic illustrations of spatially arranged printed images for sublimation consistent with disclosed embodiments.

DETAILED DESCRIPTION

Reference will now be made in detail to various embodiments, examples of which are illustrated in the accompanying drawings. Wherever possible, the same reference numbers will be used throughout the drawings to refer to the same or like parts.

Figure 1:
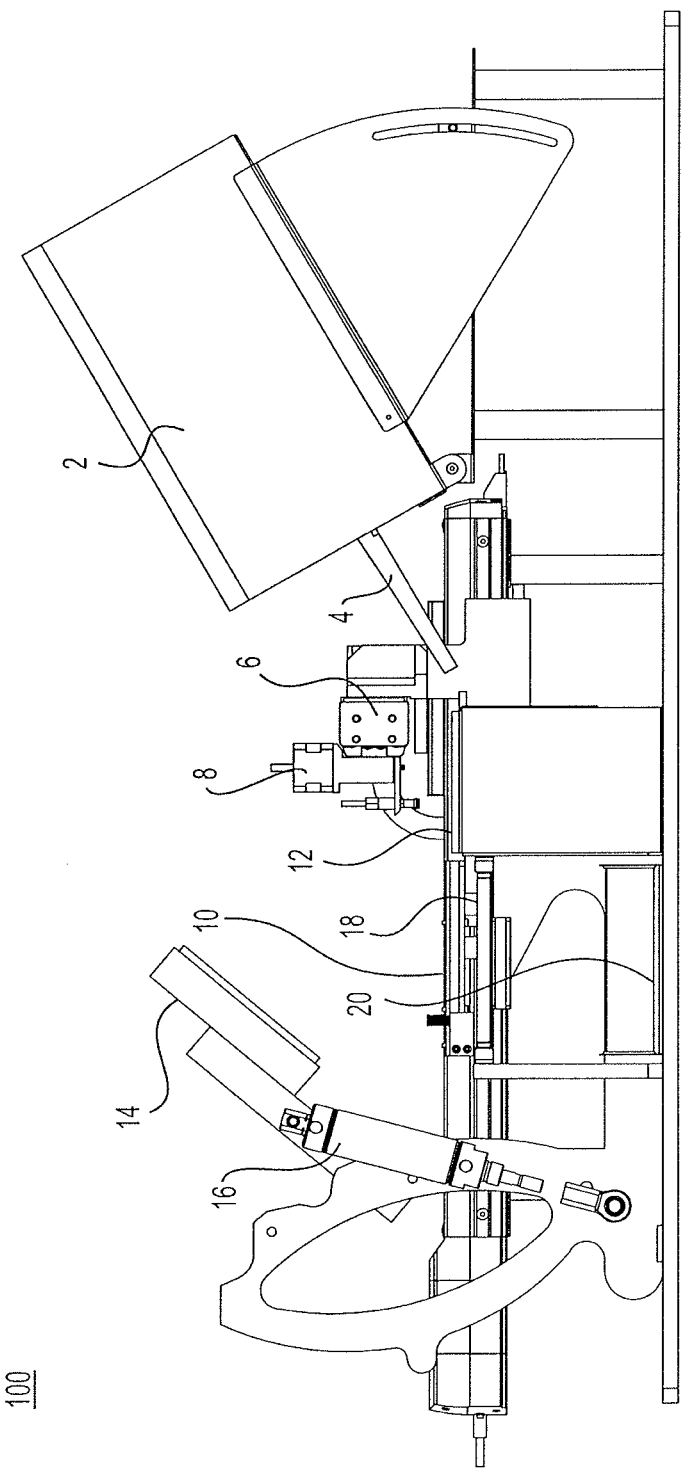
FIG. 1 is a front view of an exemplary dye sublimation transfer printing apparatus consistent with disclosed embodiments.
Figure 2:
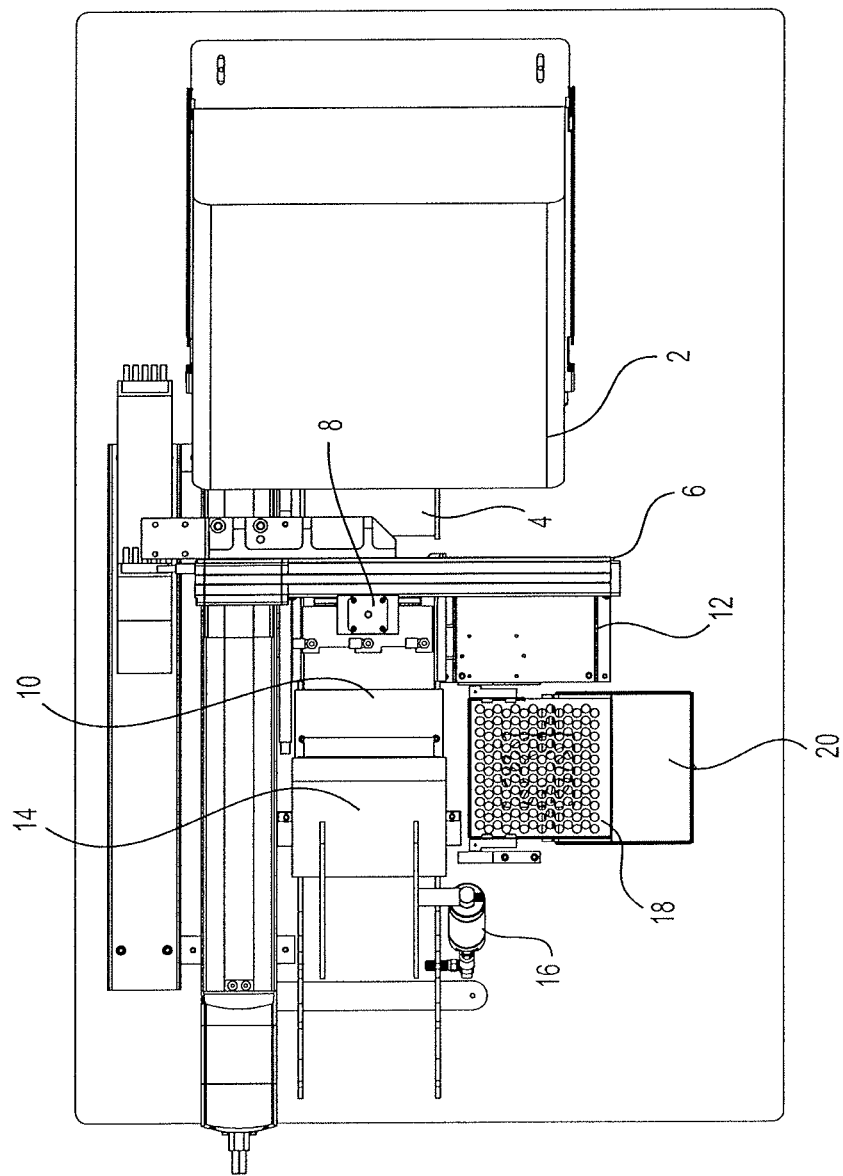
FIG. 2 is a top view of the dye sublimation transfer printing apparatus of FIG. 1.

FIGS. 1 and 2 illustrate an exemplary dye sublimation transfer printing apparatus 100. Apparatus 100 may contain various modules configured to complete printing and sublimation tasks. As used herein, "module" is not used in a manner requiring a completely separate modular arrangement. Rather, "module" is used more generally to refer to the components necessary to provide the required functionality. In effect, the noted modules are subsystems within the integrated apparatus. Depending upon the applications and requirements of a given customer, the integrated apparatus can be customized to include only the desired subsystems. As such, FIG. 1 is but one example of an apparatus within the scope of the invention.

Apparatus 100 may be configured in a variety of ways depending on the needs and applications of the user. In some embodiments, apparatus 100 may be configured as a full kiosk, in which most if not all components of the apparatus are fully enclosed. In such embodiments, all components may be fully automated and an untrained user may be capable of operating the entire apparatus. An added advantage is that the untrained user faces no risk of injury from heat, clamping, pinching, or moving parts since the kiosk is fully enclosed.

In other embodiments, apparatus 100 may be configured as a clerk-operated kiosk with an offboard inventory of products to be sublimated. In this configuration, a subset of the automated modules discussed above may be substituted with manual variations operable by an operator such as a clerk or employee of a retail establishment. A clerk-operated kiosk may be situated in a retail establishment in a location accessible to employees of the establishment, such as behind a counter or in a restricted area. In the clerk-operated kiosk configuration, apparatus 100 may or may not have all components enclosed.

In still other embodiments, apparatus 100 may be configured as a customer operated kiosk with an offboard inventory of products to be sublimated. In this configuration, a subset of the automated modules discussed above may be substituted with manual variations operable by an untrained operator such as a customer of a retail establishment. A customer operated kiosk with an offboard inventory of products to be sublimated may be situated in a retail establishment in a location potentially accessible both to customers of the establishment and to employees of the establishment. In the customer-operated kiosk configuration, apparatus 100 may or may not have all components enclosed. The non-enclosed components may not be fully accessible to the customer. In some embodiments, apparatus 100 may be configured as a hybrid kiosk with offboard inventory, with some modules configured to be operable by a clerk, and some configured to be operable by a customer.

Apparatus 100 includes a printer 2 for printing images onto transfer media. Printer 2 may be electronically configured to receive a digital image file from an operator or a customer. The digital image file may represent images such as pictures, text, stylized text, or a combination of these elements. In some embodiments, printer 2 may receive the digital image file directly, and may include digital media input interface components. In other embodiments, printer 2 may be linked via a physical or a network connection to a distinct interface device or module (not shown) which is configured to receive the digital image file and/or permit a user to determine a digital image file for printing. Apparatus 100 and printer 2 may be configured to receive a digital image file from a user in various ways, including but not limited to receiving insertion of flash memory or a USB drive, connecting via a USB or Firewire® cable, receiving image files by email, receiving image files uploaded via a mobile application, retrieving user submitted image files from an online library or website, etc. In some embodiments, apparatus 100 may include a scanner, which can receive a physical image from a user, convert it into a digital image file, and provide it to printer 2. The scanner may be further configured to enhance or alter the acquired digital image file before providing it to printer 2. Examples of image file enhancements may include, but are not limited to, changing the size of the image, rotating, reversing, or translating the image, altering color brightness, reducing blur, de-skewing, cropping, etc.

In other embodiments, printer 2 may be configured to receive a digital image file selected at the point of sale by a user from a library or database associated with an included user interface device containing a plurality of preloaded, stock image files. In some embodiments, the stock image files are separated into categories within the interface device. Examples of the categories may include, but are not limited to, a holiday, a season, and a geographic location. In some embodiments, pricing information for printing a stock image onto the desired number of products varies based on the category. For example, if the customer is attempting to purchase sublimated products in October, Halloween-themed stock images may be more or less expensive depending upon the retailer's preferences.

In still other embodiments, printer 2 may be configured to receive digital image files taken by a camera, which may be (but need not necessarily be) associated with apparatus 100. In yet other embodiments, apparatus 100 may be capable of receiving input in the form of text from a user, and may convert or incorporate the text into a printable digital image file for sublimation. Printer 2 may be configured to utilize standard sublimation dyes known in the art to print the received digital image file onto suitable transfer media. The transfer media may comprise any material capable of receiving a printed dye image, including but not limited to coated or uncoated paper, card stock, film, resin, wax, ribbon, tape, etc.

In the illustration shown in FIGS. 1 and 2, printer 2 is configured to print images onto individual sheets of transfer media. In some embodiments, printer 2 may include or be connected to a bulk storage unit containing a plurality of sheets of transfer media. In other embodiments, individual sheets of the transfer media may be fed into printer 2 one sheet at a time. Printer 2 may be configured to automatically feed the sheets of transfer media into proximity with the print head and sublimation dyes for printing. Alternatively, printer 2 may be configured as a manual, hand-fed printer in which an operator may introduce each sheet of transfer media into the printer. Some embodiments of printer 2 may be capable of both manual and automatic sheet feeding.

Printer 2 may be configured to print a dye image on one side of each sheet of the transfer media, or alternatively may be capable of printing dye images on both sides of each sheet. Printer 2 may be configured to print the images in a single pass, or may require two passes, such as for complex images, multiple colors, or multiple layers of images. For example, a printed dye image may include multiple distinct images superimposed into a single image. Printer 2 may print the superimposed image in a single pass, or may print each constituent image in its own pass through the machine.

In some embodiments, the sheets of transfer media supplied to printer 2 may be configured to facilitate transfer of a printed image onto multiple surfaces of a product. The sheets of transfer media may contain pre-treatments or features that bisect the sheets and enhance the reliability and repeatability of folding. In some embodiments, the sheets may be pre-creased. In other embodiments, the sheets may be pre-scored. In yet other embodiments, the sheets may be perforated. In still other embodiments, the bisecting feature may be a printed line that is mechanically or optically aligned to a fold bar included in apparatus 100. In these embodiments, printer 2 may print one or more images on either side of the bisecting feature of the sheet to correspond to images that will be sublimated onto various surfaces of a product. The pre creasing, pre-scoring, pre-printed line, and/or perforation of the sheets readily enables proper aliment of the printed images with respect to each other, with respect to apparatus 100, and with respect to the products to be sublimated. In some embodiments, the bisecting feature may serve as a positional register for the apparatus, since its location is predictable on the sheets of transfer media. The pre-creasing, pre-scoring, and/or perforation of the sheets of transfer media further facilitates sublimation of images onto opposing sides of a product. Apparatus 100 may include components that are configured to manipulate the transfer media at the bisecting feature (e.g. crease, score, or perforation), in a manner that substantially surrounds both sides of a product. In such embodiments, both sides can be sublimated substantially simultaneously with increased efficiency and reduced time, wear on the machine, and waste.

Printer 2 may provide printed sheets of transfer media to other components of apparatus 100 in various ways. In the illustrated embodiment shown in FIGS. 1 and 2, printer 2 is disposed at an angle such that gravity assists the providing of the printed sheets. When printing is complete, the sheet may naturally fall onto transfer media tray 4 and interact with other components of apparatus 100. In other embodiments, components may assist the printed sheets of transfer media to interact with other components. For example, printer 2 and transfer media tray 4 may interface with a feed line comprising a series of guides and rollers that may lead the sheet to the next component of the apparatus. In alternative embodiments, particularly clerk-operated kiosk embodiments with offboard inventory, apparatus 100 may be configured to simply allow an operator to place and transport the printed transfer media by hand to other parts of the system. In these embodiments, printer 2 may be disposed in a manner such that it is separate from the rest of the components of apparatus 100 and not enclosed in any kiosk or housing associated with the apparatus. For example, printer 2 and tray 4 may not be physically connected to one another. In these embodiments, an operator may feed the sheet or sheets of transfer media into printer 2 for printing, and then manually place the transfer media, now containing the printed images, onto tray 4 for introduction into the other components of apparatus 100. In still other embodiments, apparatus 100 may include an active transport mechanism, such as transport mechanism 6, to assist with positioning of the transfer media. In still other embodiments, a user may place the transfer media with a printed image directly onto a substrate within the housing, such as substrate 10.

Transport mechanism 6 may be any type of robot configured to transfer elements through apparatus 100. In the illustrated example of FIGS. 1 and 2, transport mechanism 6 is configured as a linear robotic unit disposed on rails, with a control head capable of coordinating linear movement in three dimensions. In other embodiments, transport mechanism 6 may be a true mechanical arm capable of free range motion in all directions. Transport mechanism 6 may include a stepper motor, a piezoelectric motor, or any other system of mechanized propulsion. In some embodiments, transport mechanism 6 may be battery-powered and be independent from any electrical system associated with apparatus 100.

Transport mechanism 6 (including end effector 8) may be configured to interface with the transfer media and/or products for sublimation. End effector 8 may include members that allow it to physically grasp items, such as pillars, pegs, or claws. End effector 8 may include magnets that allow it to transport and manipulate magnetic metallic items via electromagnetic force. In other embodiments, end effector 8 may be connected to a vacuum system and may be configured to pick up and transport items via suction. In some embodiments, transport mechanism 6 may contain multiple end effectors 8.

Transport mechanism 6 and end effector 8 may thus be configured to transport printed sheets of transfer media to other parts of apparatus 100. In some embodiments, mechanism 6 moves the transfer media directly from tray 4 to substrate 10. As discussed above, the printed transfer media may access tray 4 directly from printer 2, and may automatically be fed onto the tray. In other embodiments, the printed transfer media may be placed directly on tray 4 by an operator or by transport mechanism 6. Substrate 10 is a flat platen configured to receive the transfer media and align and register it to prepare for the sublimation process. In some embodiments, substrate 10 may be a bare platen comprised of metal, plastic, or composite product. In preferred embodiments, substrate 10 may be coated or covered with a thermally insulating material, such as a thermal neoprene or a foam rubber, to prevent unwanted heat transfer and loss during the sublimation process. In alternative embodiments, substrate 10 may be configured to provide heat to the sublimation process.

Substrate 10 may include components that assist in positioning and securing the transfer media to ensure faithful transfer of the printed image to a desired product. In some embodiments, particularly the clerk-operated kiosk embodiments discussed above, an operator may place the printed transfer media directly onto substrate 10, and transport mechanism 6 may assist only in registration and alignment of the printed transfer media. In some embodiments, substrate 10 may be disposed above a vacuum system (not shown) which provides light suction to secure a portion of the printed transfer media onto substrate 10. In other embodiments, substrate 10 may include one or more clamps disposed on top of the substrate to secure the transfer media to the substrate for sublimation.

Transport mechanism 6 and/or substrate 10 may include features, such as contact or non-contact sensors, to assist with the registration and alignment of the transfer media and/or the products that will receive the sublimated image. In some embodiments, substrate 10 may be disposed relative to tray 4 such that a series of mechanical guides assist in the placement of the transfer media. For example, tray 4 may be configured to form a funnel shape, such that the transfer media can only approach substrate 10 in a predetermined manner. Substrate 10 may be fitted with guide rails or other such stationary mechanical implements to position and align the transfer media and/or products. Such mechanical implements may be disposed under the immediate surface of substrate 10, and may be situated in holes or divots in substrate 10 and/or any non-conductive surface coating. In some embodiments, the mechanical implements may be retractable, and are only visible and engaged while aligning and positioning the transfer media.

In some embodiments, substrate 10 may include one or more mechanical switches that provide guidance for orientation and alignment of the transfer media. In some embodiments, the switches may serve as stops for the transfer media, such that when an edge of the media hits the switch, apparatus 100 automatically stops moving the media in that direction. In other embodiments, the mechanical switches may be configured to serve as gates, and may be retractable. The transfer media may be fed or transported over top of the gate switches, then positioned in the X-Y dimension once beyond the gates. Various configurations of mechanical switches are contemplated for assisting with alignment of the transfer media and/or products for sublimation, which will be described in further detail below.

Transport mechanism 6 and substrate 10 may also include one or more non contact sensors to aid in automatic transfer media and/or product alignment, orientation, and registration. Non-contact sensors within the scope of the invention include, but are not limited to, optical sensors, proximity sensors, or digital cameras, which may be mounted on any or all of transport mechanism 6, end effector 8, and substrate 10. For example, substrate 10 may include light sources configured to provide through beams of visible, infrared, or laser light that may indicate to an operator if the transfer media is properly aligned and registered on substrate 10. The indication may occur visually on substrate 10 or a nearby structure itself (for example, red and green LED lights, with the green light illuminating when the transfer media is properly aligned or past a certain location within the apparatus), or may be transmitted to a user interface device and presented in a graphical user interface.

In some embodiments, apparatus 100 may include a machine vision tracking system associated with transport mechanism 6, end effector 8, and/or substrate 10. The machine vision tracking system may include one or more cameras. In some embodiments, the one or more cameras may be mounted in a fixed position on transport mechanism 6, end effector 8, and/or substrate 10. Alternatively, the one or more cameras may be configured to move freely on transport mechanism 6, end effector 8, and/or substrate 10. In some embodiments, the machine vision tracking system may include an optical scanner and/or a timer. The machine vision tracking system may be configured to visually confirm that the transfer media is properly aligned on substrate 10. For example, an included camera, mirror system, or other configured structure may determine that an edge or other physical feature of a sheet of transfer media is aligned on substrate 10.

In some embodiments, apparatus 100 may include a product staging position 12. Product staging position 12 may constitute a platform, basin, magazine, or any structure/area that can receive and provide one or more products or accessories to be sublimated. When present, product staging position 12 may be a constituent part of apparatus 100, it may be adjacent to the apparatus, or it may be proximal to apparatus 100 but not in contact with its components. In some embodiments, staging position 12 is accessible by transport mechanism 6. In some embodiments, staging position 12 may be pre-configured to substantially match the dimensions of a selected product. For example, in some embodiments staging position 12 may include one or more dedicated areas or regions sized and shaped to readily it one of each of a plurality of products available to the apparatus for sublimation. In other embodiments, staging position 12 may include a single area tailored to fit a single type of product. In still other embodiments, staging position 12 may include an area tailored to universally fit any product available to the apparatus for sublimation. Staging position 12 may be configured to receive products in an automated manner from other components of apparatus 100, or alternatively may be configured to receive products manually placed by a user (e.g., a store employee or a customer).

As part of the sublimation process, one or more selected products for sublimation may be placed on staging position 12 for introduction into apparatus 100. The products may be situated on staging position 12 permanently, or may be placed there either manually or automatically for purposes of a sublimation task. Controlled orientation of the product to be sublimated is important for completion of a high-quality sublimation task. To that end, products for sublimation may comprise packaging or other external features that permit proper localization and registration of the products within the apparatus at all times. The products, whether packaged or unpackaged, may nest within one another or within the defined tailored areas of staging position 12. Products for sublimation may be comprised of various materials. In some embodiments, the products may be comprised of plastic. In other embodiments, the products may be comprised of metal, such as aluminum, brass, or steel. In alternative embodiments, the products may be comprised of a ceramic material, a fabric or textile material, wood, fiberglass, or glass. In some embodiments, the product, regardless of its constituent material, may be additionally coated with a material to enhance integration and permanence of the sublimation dye, such as a polyester material. The added coating may be introduced to the surface of the product in various ways, such as spraying, dipping, painting, etc.

Possible candidate products and accessories for use in apparatus 100 may include, but are not limited to, luggage tags, pet tags, bookmarks, identification tags, dog tags, gift tags, ornaments, picture frames, picture frame inserts, cases for a mobile device, inserts for cases for a mobile device, various types of jewelry, such as pendants, bracelets, watch bands, earrings, necklaces, etc., fabrics, such as clothing, banners, draperies, etc., and any item that could integrate sublimation dye and bear a sublimated image. In some embodiments, products for sublimation in apparatus 100 are flat plates with opposing surfaces. In some embodiments, the products for sublimation may include keys, key heads, or key blades. In other embodiments, products could be flat, three-dimensional shapes, such as cubes. In still other embodiments, curved surfaces are possible. In these embodiments, products such as coffee mugs, decorative glass products such as vases or barware, sports balls, and medical identification bracelets could be candidates for receiving sublimated images. Candidate products for sublimation may be provided by the user, or they may be disposed within or proximal to the printing apparatus. In some embodiments, described in further detail below, the apparatus may be configured as a vending apparatus and the products may be situated inside of the apparatus. In some configurations, the vending apparatus may be capable of receiving a product inserted into the machine by a user. The apparatus may be further configured to receive, sublimate, and/or dispense accessory items that match or accompany candidate products for sublimation. The accessories, in a similar manner to the products, may be contained within the apparatus, proximal to the apparatus, or may be inserted into the apparatus by a user. In some embodiments, the inserted accessory may be a pre-packaged accessory designed to accompany the customized sublimated product.

As described, transport mechanism 6 may transport a selected product from staging position 12 to substrate 10. Mechanism 6, via end effector 8, may grasp the product with included mechanical features, such as claws, hooks, etc. For metallic products, end effector 8 may engage the product with magnets. In other embodiments, end effector 8 may use vacuum suction to pick up the product and hold it while transport mechanism 6 translates end effector 8 to substrate 10. Transport mechanism 6 may be configured to place the product to be sublimated onto a sheet of transfer media pre-aligned onto substrate 10. In alternative embodiments, transport 6 may be configured to place the product directly onto substrate 10 and place the transfer media on top of the product. Transport mechanism 6 may be configured to place the product directly onto one or more of the printed images printed onto the transfer media, and may be assisted in the process by one or more of the mechanical guides, mechanical switches, optical switches, machine vision systems, or cameras associated with substrate 10 described previously. In some embodiments, transport mechanism 6 may be further configured to manipulate the transfer media to substantially surround the product once it is oriented on substrate 10, with one or more printed images thereby positioned onto each side of the product to be sublimated. The manipulation may constitute folding the transfer media at its bisecting feature, and transport mechanism 6 may execute the folding process using mechanical implements associated with end effector 8.

Apparatus 100 may sublimate the printed images on the transfer media to selected products using heating platen 14. Apparatus 100 may contain one or more heating platens. In the embodiment illustrated in FIGS. 1 and 2, apparatus 100 contains a single heating platen. However, in alternative embodiments, more than one heating platen may be employed in apparatus 100, and substrate 10 may constitute a second heating platen. In alternative embodiments, multiple heating platens may be placed in series, with non-heated platens such as substrate 10 opposing each heated platen. Heating platen 14 may be comprised of any heat conductive material, such as metal or ceramic. In some embodiments, heating platen 14 is comprised of cast iron, aluminum, or zinc.

Platen 14 may additionally be coated with a compliant material. Such a coating may comprise a foam, rubber, or plastic possessing the ability to maintain structural integrity under high temperatures and pressures. The compliant nature of the platen coating assists in the application of an even heat and pressure across all surfaces to be sublimated. Maintaining consistency of heat and pressure results in higher quality sublimated products, and reduces the risk of damage to either the product or the platen. In some embodiments, substrate 10 may be similarly coated with such a compliant material. In some alternative embodiments, heating platen 14 itself may have inherent flexibility, and may be capable of deformation across a product during sublimation to ensure even application of heat and pressure.

Apparatus 100 is configured to move heating platen 14 into contact with the transfer media as situated on substrate 10. Heating platen 14 may be configured as a pivoting assembly, such as that illustrated in the example of FIGS. 1 and 2. In such a configuration, heating platen 14 may pivot through an angular range of motion around a pin, bolt, or other fulcrum to contact the transfer media. In some embodiments, the pivoting mechanism may be machine-assisted. For example, heating platen 14 may include a hydraulic system, electrical actuator, pneumatic system, or combination thereof to control the rate of pivot of heating platen 14, and also assist with automation of the heating process. Such a system is optional, and is illustrated in the examples of FIGS. 1 and 2 as hydraulic system 16.

Heating platen 14 is operated by apparatus 100 in a single thermal cycle to sublimate the printed images from the transfer media onto the product. The single thermal cycle of heating platen 14 may be configured with a temperature, pressure, and duration sufficient to successfully transfer the image(s) to the selected product. The duration of the thermal cycle, measured as the dwell time of the platen on the transfer media, may vary based on the product to be sublimated, the transfer media, and the heating temperature of heating platen 14. In some embodiments, heating platen 14 is maintained at a temperature of about 400 degrees Fahrenheit for the entirety of the time that it is in contact with the transfer media. The pressure governing the single thermal cycle may be a defined, measured physical force.

In some embodiments, the linear distance traveled by heating platen 14 may be monitored and programmed as part of the single thermal cycle in lieu of or in addition to the pressure. In some embodiments, system 100 may include a control unit for controlling the linear distance traveled by the one or more heating platens. Controlling the linear distance may be important for avoiding breakage of a sublimated product and/or damage to the heating platen or substrate. Such a measurement could be particularly useful in the sublimation of fragile, three-dimensional objects such as ornaments or jewelry. Linear distance may be measured in some embodiments as the distance between heating platen 14 and substrate 10. This linear distance may be preset for particular products based on their known dimensions. In such an embodiment, the movable heating platen, such as heating platen 14, may be pre-configured (e.g. through software executed by the control unit) to have a "hard stop" that achieves a desired linear distance from the substrate 10. In some embodiments, the temperature, pressure, and duration of the cycle are governed by the control unit (not shown) and software that automatically configures these parameters for the heating platen for a particular sublimation task. In some embodiments, the control unit is disposed within a user interface device (not shown) which is configured to determine the parameters.

The temperature, duration, and pressure of a heating platen 14 single thermal cycle may be determined based on a variety of predetermined criteria. In some embodiments, the predetermined criteria may include properties of the product being sublimated, including but not limited to dimensions of the product, the material comprising the product, the product's shape or curvature, etc. In some embodiments, the predetermined criteria may include characteristics of the printed images, including but not limited to pixel intensity or density of the printed image, colors utilized in the image, size of the image, etc. In some embodiments, heating platen 14 may be configured to provide differential heating based on the predetermined criteria; for example, one or more regions on heating platen 14 may be heated to a different temperature than one or more other regions on the platen. In other embodiments, the differential heating may comprise one or more regions on heating platen 14 that transmit heat for a different duration of time than one or more other regions on the platen. Different pressures may also be utilized. Pressure as used herein may refer to a programmed force configured by the control and exerted as a pressing force by heating platen 14, or it may relate to a position in three dimensional space achieved by heating platen 14 during the thermal cycle (e.g., rotation of a greater number of degrees by a pivoting platen assembly would indicate more pressure being exerted, or greater travel in the Y-dimension).

The single thermal cycle of heating 14 may be further governed by external factors, such as conditions within the establishment hosting apparatus 100. As discussed above, it is ideal that apparatus 100 be capable of operating within a conventional electrical power configuration, utilizing either a standard 120 volt plug or a dedicated 240 volt plug, such as that used in larger household appliances. Apparatus 100 must be capable of heating relatively quickly without exceeding or draining the power capacity of its host establishment. Therefore, in some embodiments where available power is limited, apparatus 100 and heating platen 14 may be configured in the control software with alternate automated warm-up and cool-down cycles to permit successful sublimation within an existing electrical configuration.

Apparatus 100 may include a control unit to regulate the temperature of heating platen 14. The control unit may be the same control unit described previously that regulates the linear travel of heating platen 14, or it may be a separate control unit. In some embodiments, heating platen 14 may be consistently kept at its operating temperature. In other embodiments, heating platen 14 may be turned off and cooled down between each sublimation task. This configuration may be motivated by safety concerns or for energy efficiency. As an alternative, heating platen 14 may be configured to remain at an intermediate steady state temperature. In this embodiment, heating platen 14 may be configured to quickly increase its surface temperature from the steady state point to a sublimation temperature. Maintaining heating platen 14 at a temperature intermediate of ambient temperature (e.g. 200 degrees Fahrenheit) and sublimation temperatures (e.g. 350 degrees Fahrenheit) allows for quick ramping up to a sublimation temperature. Such a configuration may reduce the wait time to complete a sublimation task, which would lead to more profit-generating capability and more satisfied customers. The intermediate temperature should be selected such that the electronic and/or mechanical components of apparatus 100 internal to the housing are not adversely affected. To facilitate the variability of heating platen 14 temperatures, the control for heating platen 14 disclosed above may be configured to execute warm-up and cool-down cycles for the platen as needed.

In some embodiments, the control unit for heating platen 14 and/or user interface device associated with apparatus 100 may include a timer that governs the platen warm-up and cool-down cycles on a set schedule based on certain criteria. In some embodiments, the warm-up and cool-down cycles may be configured based on time of day or day of the week, to account for store traffic. For example, heating platen 14 may be kept at a higher steady state intermediate temperature (thus leading to a shorter warm-up cycle) on a Saturday afternoon versus a Tuesday morning because more traffic is likely in the host establishment on Saturdays. In other embodiments, the timer may monitor the time since the last sublimation task was completed, and may gradually cool down the platen accordingly. This functionality could be used to automatically shut down the heating platen at the closing time of the host establishment; the timer could be configured to shut the heating platen off completely after a certain number of hours have passed since the last sublimation job. Such a configuration promotes safety and energy efficiency without requiring constant supervision and monitoring of the platen temperature.

In some embodiments, the control unit for heating platen 14 may alter the configuration of the thermal cycle for the sublimation based on whether the sublimation task is single-sided or double-sided. The control unit may configure at least one of a programmed temperature, duration, pressure, or as described above, linear distance for heating platen 14 as part of the single thermal cycle. Although the range of sublimation temperatures may be relatively narrow, for energy efficiency purposes a slightly lower temperature may be utilized in a single-sided sublimation versus a double-sided, since there is no need for heat to penetrate through the thickness of the product.

Merely increasing the temperature of the thermal cycle is insufficient to sublimate opposing sides of a product simultaneously. While dramatically increasing the temperature of the heating platen when it engages the transfer media may heat the product enough to cause sublimation of the dyes, it likely also will result in overheating or melting of the transfer media onto the top surface, which, as described below, is necessarily hotter. To account for this narrow potential temperature range, the duration of the thermal cycle may be lengthened for double-sided sublimation due to thermal resistance within the material. For example, a material with low thermal resistance such as aluminum may have similar or identical thermal cycle durations for single versus double-sided sublimation; for example, in the range of fifty seconds in both cases. Materials with slightly higher thermal resistance, such as brass, may take slightly longer for double-sided sublimation. For example, double-sided brass sublimation may take sixty to seventy seconds versus fully seconds for single-sided printing. On the extreme end of the equation is a material with high thermal resistance, such as some ceramic materials. Double-sided sublimation of these materials may require durations on the order of minutes rather than seconds.

Heating platen 14 is configured to execute the single thermal cycle in a manner that sublimates printed images onto all desired sides of the selected product substantially simultaneously. Such a configuration streamlines and expedites the sublimation process, and provides the capability to provide a wide range of customized and personalized sublimation products. Advantages to printing opposing sides of a product simultaneously include increased efficiency, reliability, and repeatability of the process. Wear on the system is essentially halved, and thus the life of the machine should be increased and maintenance costs and down time should be reduced. The reduced time taken to sublimate a product for a customer enhances the attractiveness of the product offering in a retail environment; a customer is more likely to purchase a product if the product can be sublimated quickly. Moreover, quicker production time increases the revenue-generating capability of the machine, as less time per sublimation job means more jobs can be completed during operation hours. Sublimating both sides in a single thermal cycle is also an advantage because it increases the consistency of the transfer process. Again, reducing the number of processes and the complexity of such processes will extend the working life of a sublimation printing apparatus.

To facilitate double-sided sublimation in a single thermal cycle, the duration of the cycle may be altered depending on the thickness of the product. As discussed above, the programmed duration must account for thermal resistance within the material comprising the product, and must ensure that all surfaces of the product are exposed to a proper sublimation temperature of, for example, 350 to 400 degrees Fahrenheit as discussed above without overheating, warping, or otherwise damaging the platen, the product, or the transfer media. In some embodiments, an intermediate sheet of material may be placed between heating platen 14 and the transfer media to further even out heat and pressure across the surface of the item to be sublimated. The intermediate sheet may help prevent the transfer media sticking to heating platen 14, which could smudge or blur the transferred image. The intermediate sheet may be comprised of a material capable of resisting high temperatures without losing structural integrity, such as a thermal tape, or a textile. When present, this intermediate sheet may protect both the product and the apparatus, and increase reliability and repeatability of the sublimation process. In some embodiments, the intermediate sheet may remain associated with heating platen 14, and may not be removed after each individual sublimation task. In other embodiments, the intermediate sheet may be transported to substrate 10 and aligned and registered by transport mechanism 6 and end effector 8.

In some embodiments, heating platen 14 may be configured as a linear travel assembly rather than a pivoting assembly. Heating platen 14 may thus be disposed on one or more vertical rails, and its motion may be restricted to a single vertical direction.

Apparatus 100 may be configured to automatically dispose of the used transfer media from substrate 10 after heating platen 14 is translated away from substrate 10. In some embodiments, transport mechanism 6 and end effector 8 may be configured to pick up, slide, or otherwise move the used transfer media off of substrate 10. In some embodiments, apparatus 100 may include a dedicated waste collection bin to receive the used transfer media. In other embodiments, the waste may be manually collected by an operator.

In some embodiments, apparatus 100 includes an optional cooling system, an example of which is illustrated in FIGS. 1 and 2 as cooling system 18. In some embodiments, cooling system 18 may be configured to cool the sublimated product to at least about an ambient temperature. The cooling process provides safety for handlers of the sublimated object, and also helps ensure the quality and permanence of the sublimation transfer by preventing smearing, blistering, etc. In some embodiments, cooling system 18 may constitute a heat sink. Cooling system 18 may also be configured as an active cooling system. For example, as illustrated in FIG. 2, cooling system 18 may include one or more fans in addition to a heat sink. The example of FIG. 2 illustrates cooling system 18 as a perforated metal plate with a fan disposed beneath the plate. In some embodiments, cooling system 18 may be configured to sense whether the sublimated product is cooled to the desired temperature. In other embodiments, cooling system 18 may be configured to allow the product to cool for a predetermined duration of time. In such configurations, cooling system 18 and/or other components of apparatus 100 may be capable of preventing access to the product by a user or consumer until the product is sufficiently cooled. In other embodiments, cooling system 18 may include additional or alternative active cooling elements, including but not limited to a Peltier plate, a Peltier bath, spraying or immersion in liquids such as water, liquid nitrogen, etc., and a heat exchanger. In some embodiments, transport mechanism 6 may actively transport the sublimated product through a forced convection cooling field. In other embodiments, cooling system 18 may incorporate a passive method of cooling a sublimated product, such as simply allowing the product to cool over time to room temperature. In other embodiments, the passive cooling technique may cool the product via conduction, and may include placing the sublimated product in contact with a panel comprised of a material with high heat capacity and thermal conductivity, such as copper, brass, aluminum, or steel. In some embodiments, the passive cooling system may include components or elements that are capable of cooling the product through convection.

Transport mechanism 6 (including end effector 8) may be configured to transport the sublimated product from substrate 10 to cooling system 18. Alternatively, substrate 10 may be capable of rotation or translation to provide the product to system 18. Further, after cooling system 18 has cooled the sublimated selected product to about an ambient temperature, transport mechanism 6 may be configured to transport the cooled sublimated product to a final location for pickup by the user. For example, apparatus 100 may include an optional delivery opening 20. Alternatively, cooling system 18 may be capable of rotation or translation to provide the cooled product to an included dispensing chute 20. As a nonlimiting example, in FIGS. 1 and 2, the plate of cooling system 18 is mounted on a pin and is capable of pivoting, thus dropping a cooled product into delivery opening 20. As discussed above, delivery opening 20 may be configured, in concert with cooling system 18 or other components of apparatus 100, to restrict access to the sublimated product by the user until certain conditions are satisfied. For example, delivery opening 20 may prevent access to the product until it is sufficiently cooled, until payment has been coordinated and collected, or until the user has been prompted about additional product or service opportunities.

In some embodiments, apparatus 100 may include an associated user interface device (not shown). The user interface device may be configured to assist an operator in selecting one or more images to print on the transfer media, selecting one or more products on which to sublimate the printed images, controlling aspects of the sublimation process, and coordinating payment for the product. An exemplary user interface device will be described below in association with FIG. 3.

In some embodiments, apparatus 100 may further include a housing (not shown in FIGS. 1 and 2), the housing configured to enclose some or all of the components of apparatus 100 in a manner that prevents an operator from contacting the enclosed components. The housing may be comprised of metal, plastic, glass, or a combination thereof. The optional housing may serve several important functions: it protects the operator (or others) from burn, pressure, pinch, or puncture injuries that could occur as a result of contact with the apparatus components. Further, the housing protects the apparatus itself, shielding the components from wear and tear and keeping them clear of dust, insects/animals, etc. When equipped with an optional housing, delivery opening 20 may be configured to provide the product to an operator or another party outside of the housing.

As discussed above, when configured as a full kiosk, the housing protects the operator and other individuals who may encounter the machine. Heating platen 14 may be disposed within the housing such that it does not touch any of the housing walls, so as to maintain the external surface of the housing at a temperature safe for touch. Additionally, in some embodiments the housing may be equipped with a ventilation system. The ventilation system may result in ambient air flowing into the machine, either by natural convection or by forced convection, such as through a series of fans. In embodiments where the housing is configured to contain a ventilation system, the ventilation system may be further configured to interface with a larger ventilation system for the retail establishment or other structure hosting the apparatus. A ventilation system may permit heating platen 14 to be kept at a steady state intermediate temperature or even at full operational temperature, without creating burn risks to users or excessively raising the ambient temperature of the surrounding air. In some embodiments, the ventilation system may be configured to control a temperature within the housing such that the mechanical and electrical components of apparatus 100 are protected from damage and the exterior surface of the housing remains touch-safe. Allowing the enclosed components, including heating platen 14, to remain at an intermediate but safe temperature reduces system warm-up time and customer wait time.

The housing also may have value-added functions for the entity hosting the apparatus. In some embodiments, the housing may feature a decorative design that appeals to customers and attracts interest and business. The design could be proprietary to the maker of the apparatus, or could be designed by the entity hosting the apparatus. The housing may be configured such that a portion of the enclosure is transparent. Such a configuration provides entertainment and education to the user while the sublimation task is underway, and may also allow an operator to take note of components of the apparatus requiring maintenance or repair. As discussed above, offboard configurations of the apparatus may also optionally include such a housing, depending on the needs of the user.

The modular subsystem features of the apparatus promote deployment of the apparatus in a variety of ways. The apparatus may be suitable for customizable footprints to meet the needs of the hosting entity. For example, if the apparatus must fit in the corner of a room, the modular design may permit the device to wrap around the corner. A "countertop" configuration might be a good fit for a jewelry counter at a department store. The subsystem configuration increases the flexibility and versatility of the apparatus and increases the market possibilities for the invention.

In some embodiments, apparatus 100 may be configured to print images onto rolls of transfer media rather than the individual sheet configuration of printer 2 described above. In such embodiments, the apparatus components may otherwise be configured in substantially the same manner. When configured with rolls of transfer media, apparatus 100 may include one or more supply rolls of transfer media, with the inclusion of more than one roll possible to increase output capabilities. Apparatus 100 may further include spindles, pins, rollers, and other features to move the transfer media through the apparatus. Such features may be automated. Alternatively, printer 2 may be configured as a manual, hand-fed printer in which an operator may unroll a predetermined amount of transfer media and feed it manually into printer 2.

In the described alternative embodiments, the printed transfer media is fed over an intermediate roller such that it doubles back on itself. Apparatus 100 may be configured to continue to feed the printed transfer media across substrate 10 and over the intermediate roller until the images to be sublimated on opposing sides of a product are substantially aligned relative to one another and to a product to be sublimated. Registration of the transfer media may occur by tactile or digital feedback systems. In some embodiments, the rolled transfer media may contain judicial or fiducial marks on the media that are machine-readable and indicate to apparatus 100 when to halt feeding of the transfer media. Substrate 10 or an optional transport mechanism may be equipped with non-contact optical scanners and/or cameras such as those described above with respect to apparatus 100, transport mechanism 6, and substrate 10) to read the indicia on the transfer media. In alternative embodiments, the transfer media may be tractor fed and apparatus 100 may be configured to feed the transfer media a certain distance based on a predetermined number of perforated holes in the unprinted margins of the transfer media.

Using rolls of transfer media as opposed to sheets does not substantially change the operation of the disclosed apparatus. An apparatus such as apparatus 100 may be configured to print onto rolled media based on certain circumstances and conditions that would make that configuration optimal. For example, a vending machine kiosk placed in an airport hallway that is not constantly monitored may lend itself to rolled media, to prevent issues with used sheets of media jamming the system if not collected frequently. In another aspect, sublimation of smaller products, such as small pieces of jewelry, key heads, etc. may be more easily performed on a rolled media apparatus due to the difficulty of supplying and aligning sheets of media of such small dimensions. These examples are intended to be non-limiting, and it is understood that either a sheet-fed or roller-fed apparatus as contemplated by the invention is equally capable of sublimating any product comprised of a material that can incorporate sublimation dye.

Figure 3:
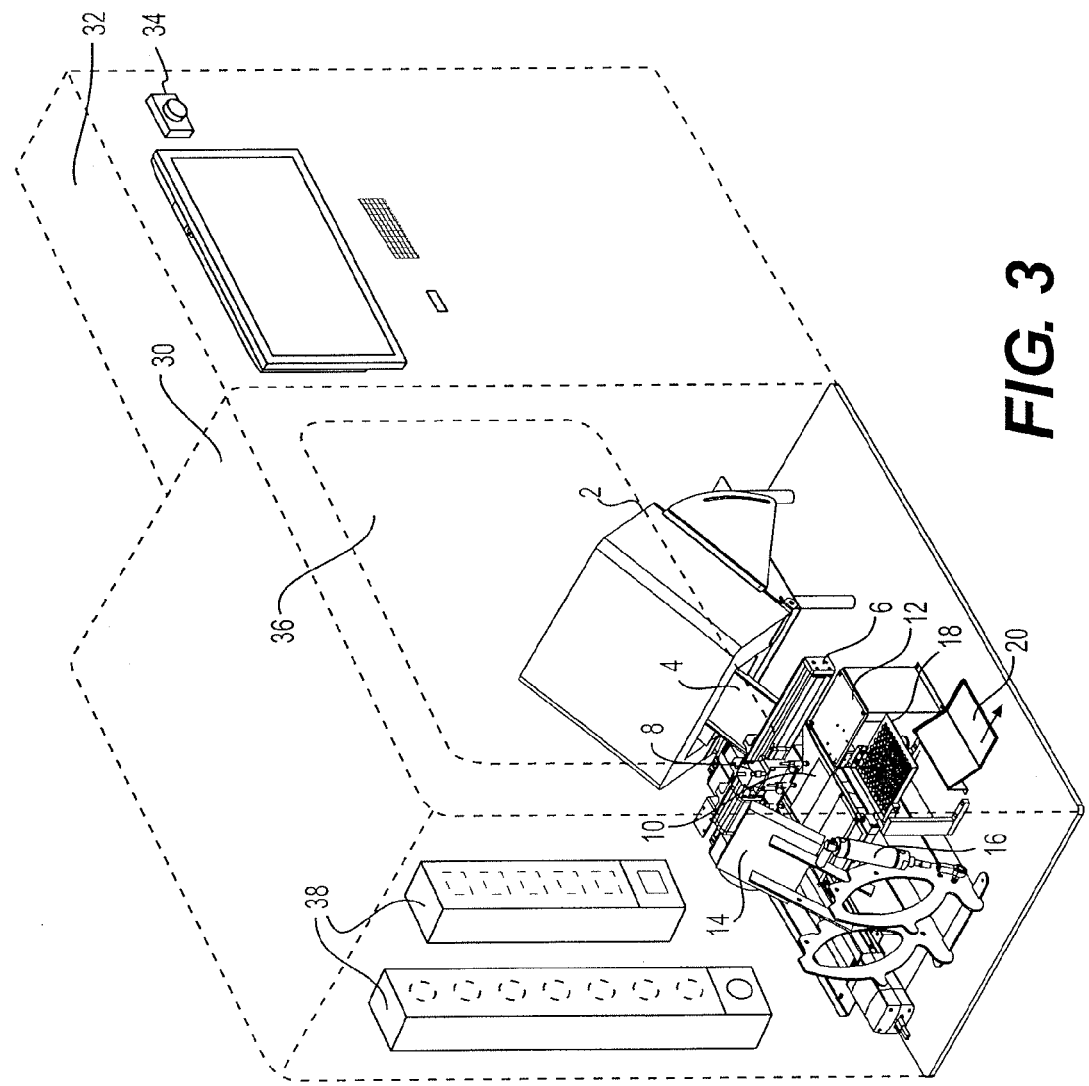
FIG. 3 is a diagrammatic illustration of an exemplary integrated dye sublimation transfer printing vending machine consistent with disclosed embodiments.

FIG. 3 illustrates the integration of an apparatus 300 similar to apparatus 100 into a housing 30 configured to permit operation of the apparatus in the manner of a vending machine. In the example shown in FIG. 3, a modified apparatus 100 (a sheet-fed sublimation printer system) is situated within housing 30. Components of the apparatus within the vending machine are substantially as described above and as depicted in FIGS. 1 and 2, with several additional features added to adapt the apparatus to a fully automated, fully contained, integrated embodiment operable by an untrained consumer safely at a point of sale in a retail setting. For example, delivery opening 20 may be disposed relative to housing 30 such that a portion of the opening extends out from the housing, such that the consumer may retrieve the sublimated product. Additionally, printer 2 is configured to maintain a supply of a plurality of sheets of transfer media. Also included within housing 30 is one or more magazines 38, which may be configured to store a plurality of products of different types. Magazine 38 may include one or more openings to dispense one of the stored plurality of products when a particular product is selected by the user. Magazine 38 may be disposed within the housing such that it is adjacent or proximal to staging position 12, and in a manner such that transport mechanism 6 (including end effector 8) or some other mechanism may readily access magazine 38 to transport a selected product from magazine 38 to staging position 12. In some embodiments, magazine 38 may be movable, and may be configured to feed a product directly onto substrate 10 or staging position 12, in some embodiments, vending apparatus 300 may contain multiple magazines 38. Each magazine may contain one type of a plurality of types of products. In other embodiments, one or more magazines 38 may be configured to store included accessories for sublimated products. Examples include, but are not limited to, key rings or key chains, covers or holders for luggage tags, frames, handles, etc. In some configurations, stand-alone accessories may also be contained in magazine 38, or may be introduced to the apparatus by a user. Accessories may serve as value-added components that add to the aesthetics or utility of the sublimated product. The accessories themselves may or may not be sublimated. Accessories may or may not be dispensed at the same time as the sublimated product. For example, one user may customize both a sublimated product and a matching accessory. Another user might purchase and customize only a sublimated product. Finally, another user might purchase and customize a sublimated product, and return to vending apparatus 300 at a later time to purchase one or more accompanying accessories for the product. As discussed above, the accessories may be pre packaged, and inserted into vending apparatus 300 by the user before, during, or after the sublimation of the product. When inserted, transport mechanism 6 may be configured to receive the inserted accessory and orient it within the apparatus for the desired function.

Housing 30 may be configured as discussed above to include a control unit to regulate the temperature of heating platen 14. Maintaining heating platen 14 at a temperature intermediate of ambient temperature (e.g. 200 degrees Fahrenheit) and sublimation temperatures (e.g. 350 degrees Fahrenheit) allows for quick ramping up to a sublimation temperature. Housing 30 may further include ventilation components or systems. When present, these systems may interface with other ventilation systems in the retail establishment hosting vending apparatus 300. The ventilation components may be configured to control a temperature within the housing such that the mechanical and electrical components of vending apparatus 300 are protected from damage and the exterior surface of the housing remains touch-safe. Allowing the enclosed components, including heating platen 14, to remain at an intermediate but safe temperature reduces system warm-up time and customer wait time.

Vending apparatus 300 may include a user interface device 32. User interface device 32 may be configured with various capabilities to facilitate the various steps of a sublimation task. User interface device 32 may include a variety of components to control other components of apparatus 300. Device 32 may contain a computing system (not shown), which may further comprise one or more processors and one or more internal memory devices. The one or more processors may be associated with control elements of apparatus 300 that position and operate the various components. The memory devices may store programs and instructions, or may contain databases. The memory devices may further store software relating to a graphical user interface, which device 32 may display to the user on an output screen. The computer system of user interface device 32 may also include one or more additional components that provide communications to other entities or systems via known methods, such as telephonic means or computing systems, including the Internet.

User interface device 32 may include input and output components to enable information associated with the sublimation task to be provided to a user, and also for the user to input required information. In some embodiments, the input components may include a physical or virtual keyboard. For example, in the example of FIG. 3, a consumer may first be prompted by device 32 to determine one or more images to be printed by printer 2 onto sheets of transfer media. Device 32 may be configured to receive a user-provided digital image file in various ways, including but not limited to receiving insertion of flash memory or a USB drive, connecting via a USB or Firewire® cable, receiving image files by email, receiving image files uploaded via a mobile application, retrieving user-submitted image files from an online library or website, etc.

In some embodiments, device 32 may be capable of outputting audible notifications or alerts to a customer or operator of vending apparatus 300. For example, device 32, via transport mechanism 6 and/or substrate 10, may receive a notification that the transfer media is misaligned or jammed based on a lack of registration of a fiducial marker. In such a situation, device 32 may be configured to audibly output "PAPER MISFEED" and contact either an on-site or remote customer service representative via audio or visual cues (such as a flashing light) to fix the problem. In another embodiment, device 32 may be configured to tell the user to "LOOK AT THE SCREEN" when information is required from the user or important information is displayed for the user. In yet another embodiment, device 32 may be configured to audibly output "YOUR PRODUCT IS READY" when the sublimation process is complete and the product is cooled to a safe handling temperature. In some embodiments, the audio output capabilities of vending apparatus 300 may extend to the input components. Device 32 may be configured such that key presses on a virtual keyboard or touchscreen associated with the device elicit confirmatory clicking noises. Additionally, the input components of device 32 may be configured to provide tactile or visual feedback to the user to indicate that an input member, such as a key of a keyboard, has been successfully pressed.

In some embodiments, user interface device 32 may include a camera 34, which can capture an image at the point of sale to utilize in the printing process and transmit the captured image to printer 2. Camera 34, in conjunction with networking capabilities of device 32, may enable a user in another physical location to perform remote diagnostics, maintenance, and calibration of vending apparatus 300, as well as perform customer service functions to assist a user of the apparatus. The memory of device 32 may contain a plurality of stock images for the consumer to choose from to supplement a user-supplied image or an image captured by camera 34. In some embodiments, device 32 may be configured to receive input of personal information from the consumer to be sublimated onto a product. Such personal information may include, but is not limited to, a name associated with the consumer, contact information, initials/monogramming, etc. Device 32 may be configured to generate an image including the received personal information. In some embodiments, device 32 may permit the consumer to select from a plurality of possible stock images to incorporate the personal information. In still other embodiments, device 32 may be configured to, at the selection of the consumer, synthesize the personal information into a selected stock image from the device memory, and provide the single synthesized image to printer 2 for printing onto transfer media. In other embodiments, device 32 may provide the consumer with the capability to select a product from magazine 38 for sublimation that is pre-printed with a stock image stored in the memory of device 32. Device 32 may be configured to store the received personal information as well as any personalized, synthesized, or stock images created or selected by the consumer. Further, device 32 may be configured to prompt the consumer for additional products that they may desire to have sublimated with the same image. Device 32 may be configured to transmit the stored consumer image to a remote network server, and may communicate an indication to the consumer information about additional sublimated or customized products that might be available for the consumer that can be printed and shipped from a remote location. The indication may be communicated to the consumer through various known means of communication, such as by telephone, email, social media, or on an internet webpage associated with one or more of the consumer, the retail outlet hosting vending apparatus 300, or the maker of vending apparatus 300. In some embodiments, device 32 may provide further options to the user, including customizing and purchasing accessories for the sublimated product, or configuring a delivery vehicle for the product. Device 32 may also be configured to prompt the user to select a companion accessory for the sublimated product. In some embodiments, the accessory also may be capable of sublimation by the apparatus. In some embodiments, the user may be prompted to insert a desired accessory into the machine, or the accessory may be contained within the apparatus. Device 32 may be configured to coordinate and collect payment for the accessory. In some embodiments, apparatus 300 may be configured to utilize the used transfer media as a delivery vehicle for the sublimated product. In such embodiments, the transfer media may be preprinted on one or more sides with text or images associated with the retail outlet hosting vending apparatus 300, or the maker of vending apparatus 300.

Device 32 and camera 34 may be configured to allow interaction with vending apparatus 300 by remote operators. Device 32 may be configured to include a "hot button" that when pressed, sends a notification to the remote operator asking for live video or audio contact with the operator of the apparatus. In some embodiments, a remote technician may be capable of being notified by device 32, and able to view system components live through camera 34. Device 32 may be further configured to enable control by the remote technician, who could then perform service on vending apparatus 300 such as clearing jammed transfer media, removing a stuck product from a magazine, retrieving a dropped accessory, etc. In other embodiments, device 32 and camera 34 may enable real-time customer service interactions with a user. When either a customer or an operator such as a store clerk have questions about the process or require assistance, a remote customer service representative may be contacted via device 32's hot button and can interact live with the customer. In some embodiments, device 32 may be configured to facilitate live video chat on an included display screen with the representative. In other embodiments, device 32 may be configured to facilitate live audio interaction with the representative, similar to a telephone call. In yet other embodiments, pressing the hot button may activate a text-based live chat, or send an email to the customer service representative. In some embodiments, the remote customer service may be a value-added service, as the service representative can assist a consumer in purchasing and customizing additional products and/or accessories.

Device 32 may be further configured to coordinate and collect payment for the sublimation task. The memory of device 32 may contain information relating to pricing for various types of the plurality of products. The pricing may vary by product, and may vary based on other predetermined criteria, such as the quantity of objects desired, image processing tasks completed, images acquired via camera 34, etc. Device 32 may display the pricing information on an output screen to the user. Device 32 may include, or be connected to, payment acceptance components that can accept cash, credit cards, or other payment methods from the consumer, such as a coupon, or a payment application on a mobile device. Device 32 may include a printer that can provide the consumer with a receipt of the payment transaction. In some embodiments, the receipt may also contain other information, such as an Internet URL for a website associated with either the retail outlet hosting vending apparatus 300, or the maker of vending apparatus 300 for purposes of additional possible products. Device 32 may be integrated into housing 30, or it may be disposed as a distinct device proximal to housing 30 but not integrated within it. It should be understood that a device similar to device 32, with any of the above configurations, may be provided as part of any apparatus contemplated by this invention, whether in a vending or retail context or not.

Housing 30 may be configured to include at least one surface portion 36 comprised of a transparent material. The material may comprise, as non-limiting examples, acrylic, glass, fiberglass, plastic, or a hybrid material. Transparent surface portion 36 may be oriented in a manner that makes the components of the dye sublimation printer apparatus, such as apparatus 100, visible to a consumer or other operator while safely shielding the user from heat, pinch points, stored energy sources, and other such potential hazards associated with the operation of heavy machinery. Transparent surface portion 36 may provide entertainment and education to the user while the sublimation task is underway, and may also allow an operator to take note of components of the apparatus requiring maintenance or repair. In some embodiments, transparent surface portion 36 may facilitate remote diagnostics, maintenance, and user assistance via the configured features of user interface device 32.

FIGS. 4A-4F illustrate exemplary images that may be associated with the apparatuses described above in association with FIGS. 1-3. In FIG. 4A, a single sheet 40 of transfer media is shown, with printed images 42 printed (by a printer such as printer 2) onto either side of the bisecting feature. Image 42 is an example of an image that may be determined by a consumer for printing. In some embodiments, the image(s) may be a user-provided digital image file received through user interface device 32. In other embodiments, the image(s) may be stock images preloaded into the memory of user interface device 32. In still other embodiments, the image(s) may constitute text input received by device 32. In yet other embodiments, the image(s) may be captured by camera 34. The image(s) may also represent a combination or composite of the above described options. In some embodiments, the consumer may provide the image by portable media as discussed above. As discussed above, a printed sheet 40 such as that described in FIG. 4A would be aligned onto a substrate, such as substrate 10, and engaged by one or more heating platens, such as heating platen 14, for sublimation onto one or more products. In some embodiments, as shown in FIG. 4A, images 42 may be mirrored by the apparatus from their original orientation to facilitate simultaneous double-sided printing. Printer 2 may be configured to automatically process and invert one of the images 42 such that they may be printed in the mirrored fashion. In some embodiments, further processing may also be performed by the printer, such as offsetting the images 42 from one another to fit dimensions of a product, altering the size of an image 42, etc. FIG. 4A also illustrates printed fiducial markers to assist in alignment of sheet 90, as discussed above. FIGS. 4B, 4C, and 4D illustrate top, side, and bottom views, respectively, of a finished product that has been sublimated using the transfer media and images featured in FIG. 4A.

In some embodiments, the printed images 42 may be mirror images of one another and are situated substantially symmetrically with respect to one another on the transfer media sheet 40. In this configuration, the same image would thus be sublimated onto the opposing sides of the product. The sublimated images may be aligned in a predetermined manner on each side of the product and aligned in a predetermined manner with respect to one another. In some embodiments, the images may be centered on the surface of the product. In some embodiments, the images may be offset from one another with respect to the bisecting feature in sheet 40, and may not be symmetrical. This may be desirable in certain product configurations, or to accommodate accessories, additional images, etc.

FIGS. 4E and 4F illustrate examples of a user-provided image 44, a stock image 46, and a synthesized image 48 as described above in relation to vending apparatus 300. Image 44, like image 42, may represent either a consumer-supplied image or an image captured by camera 34. Image 46 may be an example of a stock image, contained in the memory of a user interface device such as device 32 of apparatus 300. In the example of image 46, elements relating to a geographical destination, in this case, Hawaii, constitute the image. As discussed above, a consumer may opt, via device 32, to synthesize a consumer-provided image such as image 44 with a stock image, such as image 46, to create a synthesized image 48. The user interface device could then provide synthesized image 48 to a dye sublimation printer, such as printer 2, to print the image in preparation for sublimation. Of course, a consumer could alternatively select to print only image 44 onto a product, or only image 46. In still other embodiments, a consumer could opt to print a consumer-supplied image such as image 44 onto one surface of a product, and print a stock image like image 46 onto another surface. Other alternatives are possible, such as consumer-supplied image 44 and synthesized image 48 on opposing sides of a product, etc.

In some embodiments, particularly those illustrated above in association with vending apparatus 300 located within a retail environment, the apparatus may be configured to sublimate multiple products substantially simultaneously. Such configurations provide the ability to substantially reduce the time needed to create several sublimated products for a customer in a single process. The configuration also facilitates the undertaking of special projects by customers using the vending apparatus, which previously the customer may have avoided due to perceived cost, complexity, or time constraints. As example of the wide range of creative possibilities and markets applicable to such an apparatus, a customer could create a charm bracelet, and sublimate each of the charms for the bracelet at the same time. In other embodiments, customers could complete a large specialized task in a fraction of the time that it would have previously taken to finish it. For example, multiple party favors, gift tags, or wedding reception gifts could be sublimated in bulk—even with different images on each of the individual products. An apparatus consistent with the disclosed embodiments empowers a customer to create sophisticated, creative products in a manner that was previously impossible in the marketplace.

An automated apparatus configured to simultaneously sublimate multiple articles provides benefits to the retail establishment hosting such a device as well. Automating the sublimation process within a vending apparatus releases store employees from having to coordinate, design, and produce such products. Increasing the output capacity of a sublimation apparatus by adding the ability to sublimate multiple products increases profit-generating capabilities by saving costs. Sublimating multiple products with one thermal cycle reduces wear on the sublimation machine and uses a fraction of the resources of a machine only able to sublimate one item at a time. Instead of wasting electricity by repeatedly cycling a heat platen, wasting transfer media by only printing images for one item, and taxing internal components through constant repetitive use, the streamlined multiple product sublimation apparatus greatly reduces the impact of each of these problems. Enhanced revenue opportunities are also available with the automated apparatus, as an included user interface device such as device 32 provides the hosting establishment with multiple opportunities to ask the customer for the sale of additional items. As will be discussed further below in association with FIGS. 7 and 8, a customer may be asked if they desire more items at two critical points in the process just after they have the satisfaction of designing the customized product, and just after the gratification of seeing the finished product for the first time. In these configurations, user interface device 32 serves as a true sales-driving engine for a retail establishment hosting a sublimation apparatus.

FIGS. 5 and 6 provide visual illustration of how printer 2, user interface device 32, and other components of apparatus 300 may be configured to facilitate sublimation of multiple products at the same time. In FIG. 5A, an example product 50 is illustrated, with dimensions of one inch by three inches. Products of this size might include dog tags, bookmarks, or pendants, and be comprised of various materials, such as aluminum, brass, or ceramic. FIGS. 5B, 5C, and 5D illustrate potential configurations of printer 2 to permit simultaneous sublimation of both sides of two, three, and four of these products, respectively, onto a sheet of transfer media 52. The configurations illustrated in FIGS. 5B, 5C, and 5D are merely exemplary. In some embodiments apparatus 300 may be configured to print on only one side of each desired product, and in some embodiments apparatus 300 may be configured to print different images onto opposing sides of a desired product. In some embodiments, at least one of the desired products may be a different shape than another one of the desired products. For example, apparatus 300 may be configured to print onto holiday ornaments of different shapes, or one of the rectangular products shown in FIGS. 5B, 5C, and 5D may be square rather than rectangular. In these embodiments, the differently-shaped products may be comprised of the same material and possess the same thickness, to ensure even distribution of heat and pressure by heating platen 14. In other embodiments, the differently-shaped products may be comprised of different materials. In some embodiments, the differently-shaped products may have slightly different thicknesses. As discussed above, heating platen 14 may be covered with a compliant material to accommodate slight variations in product thickness across multiple products without a loss in quality or performance of the apparatus.

In FIG. 5B, a spatial arrangement 54 is illustrated, demonstrating how the apparatus might be configured to simultaneously sublimate both sides of two individual examples of product 50 in a single thermal cycle. In the example illustrated in FIG. 5B, the transfer media is divided by a bisecting feature as described above, and each half of sheet 52 is approximately four inches by six inches in size. The dimensions of sheet 52 as shown in FIG. 5 are exemplary, and sheet 52 may be configured in a variety of dimensions to account for configurations of apparatus 300 or various desired applications. In some embodiments, as shown in FIG. 5B, the multiple images are printed on the paper in a spatial arrangement that meets several defined objectives. First, the images must be adequately spaced apart from one another on the media. Proper spacing assures an even distribution of heat and pressure from heating platen 14 across substrate 10. This ensures consistency of the sublimation for each of the multiple sublimated products. If, for example, images were instead clustered in one corner of the transfer media or were otherwise irregularly offset, that configuration would present a risk of some of the multiple products being heated differently or receiving a different pressure from the engagement of heating platen 14 with the transfer media. Uneven spacing could therefore also damage the products, and even the heating platen itself. It is therefore advantageous to automate the printing of the images on the transfer media to account for the need to accurately and precisely spatially arrange the images. Another objective is to provide enough space between the printed images to avoid overlap or bleedthrough onto a neighboring product. If printed images such as those in spatial arrangement 54 are printed too closely together on sheet 52, it may be impossible for apparatus 100 to simultaneously complete the sublimation task for each product individually. The printed images in FIG. 5B and spatial arrangement 54 also illustrate a further advantage of an apparatus configured in this manner: multiple products may be simultaneously sublimated with different images. The top set of printed images are illustrated as picture-based images, while the bottom set comprise text-based images. Either type of image, as well as combinations therein, are possible in this automated system.

In FIG. 5C, images have been printed on the transfer media for sublimation onto product 50 using a spatial arrangement 56. Spatial arrangement 56 differs from spatial arrangement 54 in that both sides of three examples of product 50 are to be sublimated rather than two. The dimensions of sheet 52 still permit the images to be printed in the same general orientation in spatial arrangement 56 as they were in spatial arrangement 54, but the images are now printed slightly closer together on the media. In contrast, FIG. 5D illustrates simultaneous printing of both sides of four examples of product 50 via spatial arrangement 58. Apparatus 100 may determine that the respective dimensions of product 50 and sheet 52, as in this example, may no longer permit printing of horizontal images on the transfer media without crowding and overlapping. To avoid this potential. Issue, apparatus 300 may configure printer 2 to simply rotate the images and print them in an orientation that would permit the desired number of products to be simultaneously sublimated. Obviously, the number of products with a given set of dimensions that can be sublimated on an apparatus is not unlimited. When a customer desires to sublimate more of a certain product than the apparatus can accommodate at one time, user interface device 32 may simply determine a spatial arrangement that sublimates as many products as possible for the particular configuration, then notify the customer that additional sublimation cycles will be necessary. In some embodiments, if a sublimation task will require multiple cycles, user interface device 32 may give the customer the option of returning later to pick up the entire order. In alternative embodiments, if the customer is unable to wait to pick up all desired products, apparatus 300 may be configured to coordinate shipment of the desired products to an address of the customer's choosing, and may coordinate production of the sublimated items either itself or by a remote apparatus.

FIG. 6 provides similar examples to those of FIG. 5, but with a different-sized product. In FIG. 6A, an example product 60 is illustrated, with dimensions of one inch square. Products of this size might include for example charms, pendants, decorative tiles, or coins, and be comprised of various materials, such as aluminum, brass, or ceramic. The smaller size of product 60 as compared to product 50 allows for more variety and complexity of possible spatial arrangements, as shown in FIGS. 6B, 6C, and 6D.

FIG. 6B illustrates a "baseline" sublimation task with spatial arrangement 62 where only a single product 60 is to be sublimated. In this embodiment, images to be sublimated onto product 60 might be placed substantially in the center of sheet 52. In contrast, FIG. 6C illustrates a spatial arrangement 64, where three examples of product 60 are to be sublimated. As in FIG. 5C, the spatial arrangement for three items simply requires that apparatus 300 and user interface device 32 evenly space the printed images on the transfer media, to ensure equalized heating and pressure and avoid crowding. Spatial arrangement 64 also illustrates several optional variations for sublimation that are possible with different configurations of apparatus 300. As illustrated in FIG. 6C, in some embodiments only one side of a product may be sublimated with an image. Further, in some embodiments different images may be sublimated on opposing sides of the same product. In FIG. 6D, however, spatial arrangement 66 is illustrated and requires sublimation of five products 60. The illustrated exemplary dimensions of sheet 52 may not permit five products 60 to be sublimated side-by-side in the manner of spatial arrangement 64. Although five products 60 could theoretically be placed side-by-side along the broad dimension of sheet 52, doing so would likely leave insufficient space between each product and between the products and the edge of sheet 52. Such a configuration may also risk uneven pressure distribution by heating platen 14 as described above, since only one relatively small horizontal region of the plated would be employed. Apparatus 300 may be configured to adapt to such a scenario by configuring other possible spatial arrangements. In FIG. 6D, the five sets of images are arranged on sheet 52 somewhat reminiscent of the arrangement of the five dots on a die or a domino. This arrangement facilitates both sufficient spacing and proper heat and pressure distribution across heating platen 14. Any combination of configurations is possible in determining a spatial arrangement, so long as the images are adequately spaced on sheet 52 and do not overlap with one another.

A process for determining spatial arrangements, such as the ones discussed above, will now be described. Vending apparatus 300 may be configured to perform a spatial arrangement determination process 700, such as that shown in the example of FIG. 7. In one embodiment, user interface device 32 associated with apparatus 300 may receive a customer input indicating a desire to sublimate one or more products (Step 710). Device 32 may further prompt the customer to specify a number of products that they wish to sublimate (Step 720). In some embodiments, device 32 may be configured to provide the user discrete choices of number based on available spatial arrangements. For example, device 32 may be configured to present choices in multiples, such as multiples of three or four items.

Device 32 may generate and present to the user pricing information for the sublimation task (Step 730). Pricing information may be stored in memory associated with device 32 and automatically presented; for example, a unit price for a given product may be stored in the memory and the price presented to the user may simply be the unit price multiplied by the number desired. In other embodiments, device 32 may be updatable via a network link, so that different products may be priced differently on command. In some embodiments, the pricing information may include additional information relevant to the customer, such as an incentive or a bulk discount. These embodiments will be discussed further below in association with FIG. 8. After presenting the pricing information to the user, device 32 may determine if the customer desires additional products based on the pricing; for example, to take advantage of a discount or incentive (Step 740).

After determining the number of desired products, as well as the type of each product to be sublimated, device 32 may receive an indication of one or more images to sublimate on each of the desired number of products. As discussed in detail above, the images may be provided by the user as digital image files, may be selected from a memory associated with device 32, or may be selected using device 32 from a plurality of images stored on a remote server. In other embodiments, the digital image files may be captured by a camera, such as camera 34 associated with user interface device 32. In some embodiments, the images printed on the transfer media may comprise images or digital image files from a combination of these sources.

Once all products and images have been properly received and accounted for within device 32, one or more processors associated with the device may analyze relevant spatial parameters relating to the sublimation task (Step 760). For example, device 32 may account for the size of the transfer media currently available to printer 2. Device 32 may further analyze the products selected for sublimation, and determine how many products are capable of fitting on the transfer media in a manner where they are adequately spaced and not overlapping. If the desired number of products exceeds the possible number of products that can be sublimated in a single thermal cycle, device 32 may inform the customer via visual or audible notifications. The customer may amend their desired amount, or may simply opt to have their desired number of products sublimated using as many cycles as necessary. Device 32 may further analyze the size of the images, and resize or otherwise enhance them as described above in order to optimize the spatial arrangement.

Device 32 may determine a spatial arrangement for the images based on the analyzed parameters and the selected products (Step 770). In some embodiments, a processor associated with device 32 may be configured to make a new determination for each sublimation task. In other embodiments, device 32 may be configured to save previous parameters and arrangements, or operate off of a pre-loaded list. For example, in some embodiments, device 32 may include a stored lookup table in internal memory, and determining the spatial arrangement may comprise inputting the type of product and number of products to be sublimated into the table. The lookup table may output possible spatial configurations to device 32, and device 32 may configure printing of the images by printer 2 based on the solutions given by the lookup table. In some embodiments, multiple spatial arrangements may be deemed acceptable. In these embodiments, device 32 may select one of the acceptable arrangements. In other embodiments, device 32 may even prompt the customer to select an arrangement from a series of possible acceptable arrangements. Device 32 may then configure printer 2 to print the images onto the transfer media using the selected arrangement (Step 780). The print heads of printer 2 may be configured using software to precisely print the images at the predetermined locations on the transfer media to achieve the selected spatial arrangement.

Since the described embodiments that assist device 300 in determining a spatial arrangement are software-based, new apparatuses may be produced to include the features, or older models may be retrofit to include them. Thus, an existing vending apparatus may be configured to perform a multiple product sublimation process, such as that shown in the example of FIG. 8. In one embodiment, vending apparatus 300, via user interface device 32 and printer 2, may perform a spatial arrangement determination process (Step 810). The process may be substantially the same as process 700 described above in association with FIG. 7. In brief, user interface device 32 may receive an input from a customer indicating a desire to sublimate one or more products. Device 32 may prompt the customer to input the type of product and number of products that they wish to sublimate. Based on the received inputs, device 32 may determine pricing information for the sublimation task, and present the pricing information to the customer via output devices associated with user interface device 32, such as a video screen or a printed summary from an associated printer. In some embodiments, the pricing information may include information relating to a discounted unit price for each of the products the customer desires to sublimate based on an increased quantity of products. For example, a graphical user interface associated with device 32, such as the one described above, may inform the customer that "SUBLIMATING ONE PRODUCT TODAY WILL BE $2.00. YOU CAN ALSO GET 3 PRODUCTS TODAY FOR THE PRICE OF 2—AND WE'LL DO THEM ALL AT THE SAME TIME!" This presentation is exemplary only, and any number of volume discounts may be determined that can be presented to the customer. Based on the presented pricing information, user interface device 32 may receive an indication via an input device (such as a keyboard, touchscreen, etc.) that the customer wishes to revise the number of products to sublimate. In some embodiments, the customer may wish to increase the desired number of products so as to take advantage of the previously presented bulk discount.

As discussed above in the context of process 700, the user interface device 32 may receive an indication of one or more images that the customer wishes to sublimate onto the desired number of products. After analyzing relevant spatial parameters, such as the size of the product and the size of the images, apparatus 300 may determine a spatial arrangement for printing the images onto the transfer media, such that as many of the customer's desired number of items may be sublimated at the same time as possible. Printer 2 then may print the images onto the transfer media in the determined spatial arrangement.

Based on the inputs received from the customer relating to the type and number of products that the user wishes to sublimate, apparatus 300 may be configured to retrieve and position the selected products onto the transfer media (Step 820). User interface device 32 may configure transport mechanism 6 and end effector 8 to retrieve a particular number of products based on the number of products that the customer wishes to sublimate. For example, if the user desires to sublimate five of a given product, transport mechanism 6 may be configured to retrieve one product, place it on the transfer media, then return four more times to repeat the process. In some embodiments, transport mechanism 6 may retrieve the products from staging position 12, where a supply of a plurality of products may have been pre-placed. In other embodiments, transport mechanism 6 may be configured to retrieve the desired number of products directly from magazine 38, and magazine 38 may be configured to release one product at a time to facilitate the process.

In some embodiments, the products to be sublimated may all be identical in shape, size, and composition. In these embodiments, transport mechanism 6 may be configured to place the products in any order onto the transfer media. In other embodiments, a particular printed image may correspond to a particular product. In these alternative embodiments, user interface device 32 may control transport mechanism 6 to match the particular product and the particular image. Transport mechanism 6 may be configured to detect particular products through various configurations described above, including but not limited to reading indicia pre-printed on product packaging, retrieving products from dedicated magazines containing only certain types of product, retrieving products from areas of staging position 12 dedicated only to certain types of product, etc. In some embodiments, end effector 8 may be configured to pick up more than one product at a time to transport to the substrate, up to and including the full number of products desired by the customer. In these embodiments, end effector 8 may be equipped with mechanical grasping implements to assist with retrieving and placing multiple products. When configured to pick up multiple products, end effector 8 may be configured to place the products sequentially on the transfer media according to the determined spatial arrangement.

Alignment of each selected product on the transfer media may also utilize one or more of the mechanical guides, mechanical switches, optical switches, and machine vision tracking systems described above. Each of the desired products may be placed and aligned onto one of the printed images on the transfer media. Transport mechanism 6 may ensure precise alignment of each of the products by lining up one or more virtual reference points on each product with corresponding virtual reference points on its destination image. This process will be described further below in association with FIGS. 9 and 10.

In some embodiments, transport mechanism 6, may further be configured to manipulate the transfer media to substantially surround the products (Step 830), wherein at least one printed image is positioned on each side of each product to be sublimated. Transport mechanism 6 may manipulate the media using end effector 8. End effector 8 may be configured to include mechanical elements to manipulate the media, such as pegs, hooks, etc. In embodiments where apparatus 300 is equipped with a supply of sheets of transfer media, apparatus 800 may be configured to manipulate the transfer media by folding the media along a bisecting feature as discussed previously. Upon folding the media, one or more images may be positioned proximal to each side of each product to be sublimated.

Process 800 continues with vending apparatus 300 moving at least one heating platen, such as heating platen 14, into contact with the transfer media (Step 840) and sublimating the one or more printed images onto the desired number of products substantially simultaneously (Step 850). In some embodiments, parameters for the single thermal cycle that enable simultaneous printing on multiple products may be determined automatically by apparatus 300 as described above. The control unit associated with heating platen 14 may determine the parameters for the single thermal cycle based on a number of predetermined criteria. For example, as discussed above, the control unit may configure a programmed duration of the single thermal cycle sufficient to achieve a sublimation temperature at the surface of each side of each of the desired number of products to be sublimated. In some embodiments, the products may all be sublimated on only a single side. In other embodiments, the products may all be simultaneously sublimated on two sides in a double-sided sublimation process. In yet other embodiments, some products may be sublimated on one side, while others are sublimated on two sides. Apparatus 300, printer 2, and control units associated with heating platen 14 may alter the configured duration of the single thermal cycle based on any or all of these factors. For example, the duration may be slightly longer for a high number of products that are all sublimated on two sides than for a lower number of products sublimated on only a single side.

Vending apparatus 300 may be configured to determine if the customer desires to sublimate additional products once the initially-desired number of products have been sublimated (Step 860). In embodiments where the customer desires to sublimate more products than were possible to fit on one sheet of transfer media, apparatus 300 may be configured to automatically repeat Steps 810-840 and continue to sublimate until the desired number of products have been completed. In other embodiments, user interface device 32 may be configured to prompt the customer whether they would like more or different sublimated products using the same printed images, or different images.

It is advantageous to prompt the customer if they would like more products before collecting payment, as the entertainment value of the sublimation process (visible through transparent surface 36) may engender positive feelings in the customer and generate additional sates opportunities in the moment at the point-of-sale. For example, in some embodiments, device 32 may present via graphical user interface "LIKE WHAT YOU SEE? WOULD YOU LIKE SOME MORE OF THEM?" In some embodiments, the customer may be presented with new pricing information, reflecting further potential discounts available for purchasing more products. In other embodiments, the same discount pricing information presented at the beginning of the transaction may be again brought forward for the user's consideration.

In some embodiments, device 32 may be configured to enable the customer to order additional products in a later order. The later order may be produced by the same apparatus 300 as the initial set of products, or other configurations are possible. For example, device 32 may provide the customer with a website URL to order additional products from home, have them produced at a remote facility, and have them shipped to an address associated with the customer.

Apparatus 300 may be configured to coordinate and collect payment for the purchased sublimated products (Step 870). As discussed above, actual receipt of payment may be delayed in some embodiments until after the sublimation of the customer's original number of products is completed, in order to provide an opportunity to ask the customer if they desire more products. In some embodiments, payment may be collected by credit card directly at apparatus 300 using device 32; in other embodiments, device 32 may print a receipt or other similar output enabling payment for the products at another location within the establishment hosting the apparatus. Apparatus 300 may be configured to accept a payment method at the beginning of the sublimation task, but not complete the transaction until the end of the task. This configuration facilitates the addition of other products, accessories, or features to the task without requiring the customer to repeat the payment method a second time.

Vending apparatus 300 may be configured to provide the product to the customer via a delivery opening (Step 880). After sublimating the image onto the selected product, in some embodiments vending apparatus 300 may optionally cool the printed product to at least about an ambient temperature. Vending apparatus 300 may cool the product using an optionally equipped cooling system 18 as described above. Vending apparatus 300 may employ an active cooling system, using fans, sprayers, water baths, etc., or may employ a passive system, such as heat sinks and thermally conductive panels. As discussed above, vending apparatus 800 may be configured to limit consumer access to the sublimated product via the delivery opening until the product has sufficiently cooled. Access may also be limited until the customer has paid for the products, or until the customer has been prompted whether they desire more products.

As discussed above, proper alignment of the transfer media in a sublimation printing apparatus such as apparatuses 100 or 300 described above is particularly important when the apparatus is configured to sublimate multiple products simultaneously. Even a slight misplacement of the transfer media, and thus the printed images, may trigger errors that are propagated onto each of the products, resulting in significant waste, loss of resources, and frustration for the customer, in some embodiments, the transfer media may contain one or more printed indicia and/or fiducial markers readable by the machine vision tracking system described previously to confirm location and orientation of the transfer media. An example of such an embodiment is illustrated in FIG. 9.

Figure 9:
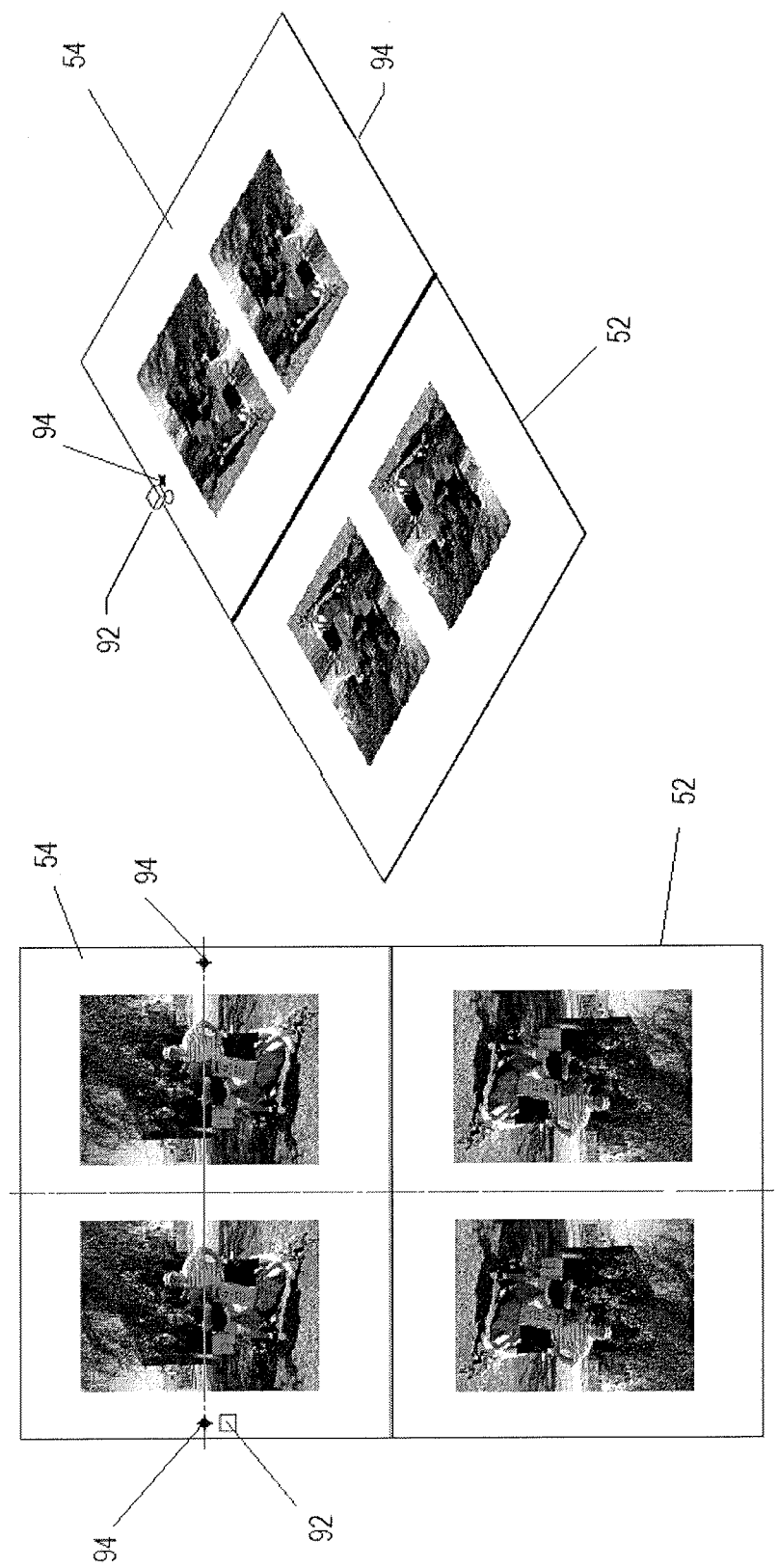
FIG. 9 is a diagrammatic illustration of optional registration and alignment features consistent with disclosed embodiments.

FIG. 9 illustrates a top view and a perspective view of a sheet of transfer media with images printed on its surface, such as sheet 52 and images printed according to spatial arrangement 54 described above in association with FIG. 5. In the example illustrated in FIG. 9, the sublimation apparatus (which may be, for example, any one of apparatuses 100 or 300) may be equipped with a machine vision tracking system 92. System 92 may be substantially as described above, and may include one or more cameras, as well as one or more control units capable of executing software commands. System 92 may be mounted in a fixed position on a transport mechanism, such as transport mechanism 6, or it may be configured to freely move along the mechanism. In the example of FIG. 9, sheet 52 has been printed with a set of fiducial markers 94.

Tracking the location of the printed sheets of transfer media using the fiducial markers at all times within the apparatus may be important to ensure quality of the image transfer and to prevent hazards, such as overheating or melting of the transfer media. Even slight overheating of transfer media may create extremely unpleasant odors that could irritate the user and other surrounding customers. Therefore, the machine vision tracking system 92 may be configured to confirm the location of a given sheet of transfer media such as sheet 52 in the apparatus using visual confirmation or scanning means at set time periods, or when contact or non-contact sensors detect that sheet 52 has progressed to a new part of the apparatus. The machine vision tracking system 92 may determine that sheet 52 is susceptible to overheating and preemptively act to de-energize the heating platen and request service. This process may occur, for example, when the machine vision tracking system 92 determines that the media and heating platen have been in contact for a time period exceeding a predetermined threshold value. The predetermined threshold value may be based on the temperature of the platen or properties of the product being sublimated.

The fiducial markers 94 may also serve as indicators of the performance of the apparatus; if the apparatus senses via the markers that the transfer media is being consistently misaligned, hung up, or otherwise not moved smoothly through the system, it may indicate that the apparatus requires maintenance. Markers 94 may constitute machine-readable barcodes, printed patterns, QR codes, etc. In some embodiments, markers 94 may be directly read by machine vision tracking system 92. In other embodiments, images of markers 94 may be captured by a camera, which may or may not be part of system 92, and the images may be analyzed and confirmed via software. Markers 94 may be pre-printed on sheet 52, or they may be printed by printer 2 at the time images are printed onto sheet 52 in a spatial arrangement such as spatial arrangement 54. In some embodiments, the markers 94 may constitute crosshairs, and one or more markers may be placed around the periphery of the printed image to assist with alignment tasks governed by transport mechanism 6 and substrate 10 as described.

In some embodiments, fiducial markers 94 may be utilized by apparatus 100 or 300 to perform an automatic self-calibration process. A user interface device associated with the apparatus may configure printer 2 to print calibration images onto transfer media. The calibration images may comprise a pattern readable by components of the apparatus, such as machine vision tracking system 92, as well as a set of fiducial markers 94. Once printed, the transfer media bearing the calibration images may be transported from printer 2 to substrate 10 by transfer mechanism 6 and end effector 8, as described. Machine vision tracking system 92 may be configured to track the alignment of the calibration images using fiducial markers 94 as described above. System 92 may be further configured to compare the location of markers 94 (e.g., using coordinates) when the transfer media is aligned on substrate 10 to a pre-determined set of coordinates associated with an "ideal" alignment, such as a "home" position, or a default configuration. System 92 may be configured to determine offsets in each dimension using the calibration images on the transfer media. The offset information may be stored locally in a memory device associated with the user interface device, or the user interface device may be configured to transmit the information to a remote server. Apparatuses 100 or 300 may be configured to automatically adjust the calibration of relevant components to correct the offsets, such as printer 2, transport mechanism 6, end effector 8, substrate 10, or machine vision tracking system 92.

Figure 10:
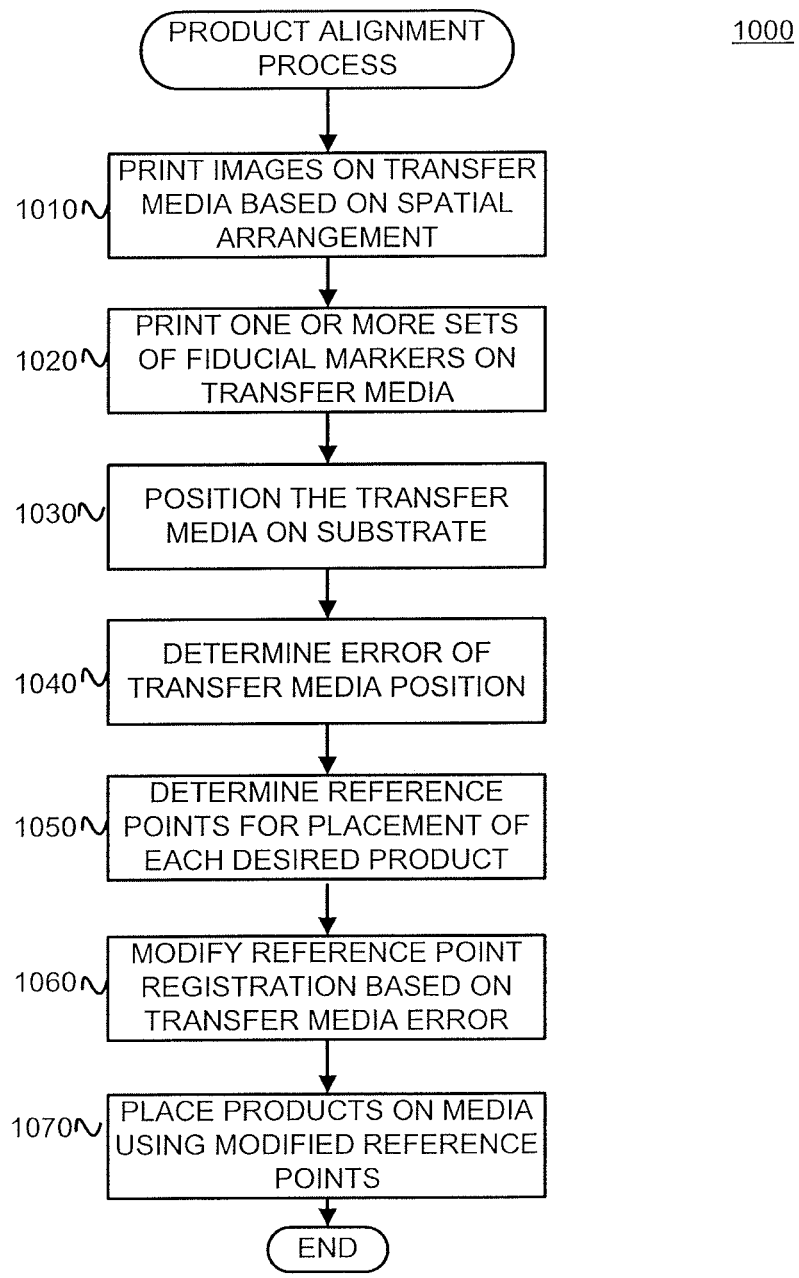
FIG. 10 is a flowchart of an exemplary product alignment process, consistent with disclosed embodiments.

A sublimation printing apparatus (such as apparatus 100 or 300 described above) may be configured to perform a product alignment process 1000 to ensure successful simultaneous sublimation of multiple products, such as that shown in the example of FIG. 10. In one embodiment, the apparatus, via a printer such as printer 2, may print images onto a transfer media based on a determined spatial arrangement (Step 1010). As described above, the printed images may be received by printer 2 as digital image files by a variety of different means. The spatial arrangement may be determined as described above in association with process 700 and FIG. 7.

As discussed above in the example of FIG. 9, in some embodiments, printer 2 may print one or more sets of fiducial markers, such as markers 94, onto the transfer media (Step 1020). In alternative embodiments, markers 94 may be pre-printed onto the transfer media before introduction into printer 2. The location of markers 94 may be variable based on the size and position of the printed images, as well as the size and shape of the product to be sublimated. Printer 2 may be configured with software to determine proper arrangement of markers 94. In some embodiments, a user interface device such as device 32 described above may be included in the apparatus, and may determine the proper arrangement of markers 94. Device 32 may subsequently configure printer 2 to print markers 94 on the transfer media.

The apparatus, via a transport mechanism such as transport mechanism 6, may position the transfer media on a substrate, such as substrate 10 (Step 1030). This process may occur substantially as described above, and transport mechanism 6 (including end effector 8) and/or substrate 10 may include various sensors or systems to ensure proper feeding and translation of the transfer media onto substrate 10.

In some embodiments, placement of the transfer media may not exactly match an "ideal" or perfect placement, as described above. Due to imperfections in the transfer media, substrate 10, disruption by ambient air flow, etc., the transfer media may be mislaid to a certain extent. The apparatus may determine an error measurement for the transfer media aliment based on variations in the coordinate positions of markers 94 as compared to stored coordinate positions of an "ideal" alignment (Step 1040). Errors even as small as ten thousandths of an inch (0.010 inches) could result in a lower quality sublimation transfer when multiple products are to be sublimated, because the error will be propagated for each and every product. As discussed above, the error measurement data may be utilized by the apparatus to automatically self-calibrate relevant components of the apparatus to correct the errors.

In some embodiments, transport mechanism 6 and end effector 8 may be configured to simply move the transfer media such that markers 94 do align with the coordinates of "ideal" placement. However, in other embodiments it may be preferable to simply adjust the placement of each of the multiple desired products to be sublimated in order to account for the error in the placement of the transfer media. In some embodiments, transport mechanism 6 and/or device 32 may determine virtual reference points for placement of each product to be sublimated relative to the "bottom image;" that is, the image that will eventually be sublimated onto the bottom surface of the product (Step 1050). These virtual reference points may be coordinate positions on each of the printed image and/or each product, and may be determined by transport mechanism 6 and/or device 32 using software. In some embodiments, where the sublimated image within the spatial arrangement is to be centered on a product, the coordinates may be the centroid of the printed image and the bottom surface of the product. In other embodiments, the coordinates of the virtual reference points may be located elsewhere on the image and/or the products.

The sublimation apparatus may account for any error determined in the placement of the transfer media on substrate 10 in Step 1040, using fiducial markers 94, and modify the virtual reference points for placement of each of the multiple products accordingly (Step 1060). For example, if the apparatus determined that the transfer media was mislaid by 0.03 inches in the X direction and 0.06 inches in the Y direction, software components associated with the apparatus may adjust the virtual reference point of each product by the same amount to counter the error in the placement of the transfer media. Transport mechanism 6 may then be configured to place each of the products on the transfer media using the modified virtual reference points (Step 1070). In some embodiments, transfer mechanism 6 and/or machine vision tracking system 92 may capture an image of all of the products once transport mechanism 6 has placed them on the transfer media, and associated software components may visually confirm that each one of the multiple products is properly placed and aligned for sublimation.

Figure 11:
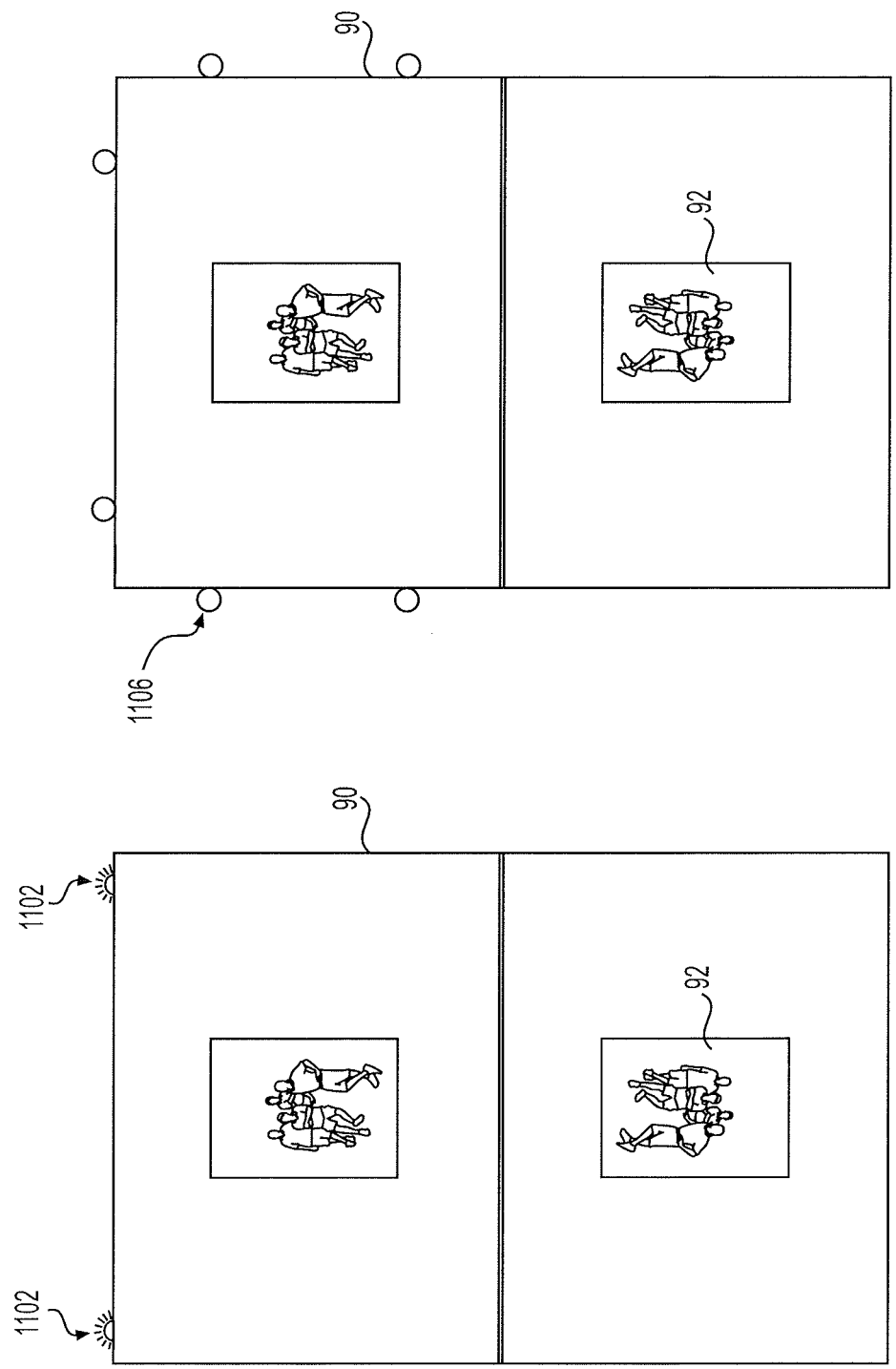
FIG. 11 is a diagrammatic illustration of optional registration and alignment features consistent with disclosed embodiments.

In some embodiments, as discussed above, alignment of the transfer media on the substrate of a disclosed apparatus (such as substrate 10) may be additionally facilitated by optional mechanical sensors and or non-contact sensors. Examples of such implements are illustrated in FIG. 11. As discussed above, proper alignment of the transfer media in a sublimation printing apparatus such as apparatuses 100 or 300 described above is particularly important when the apparatus is configured to print on opposing sides of a product or on multiple products substantially simultaneously.

Transport mechanism 6 and substrate 10 may include one or more non-contact sensors 1102 to aid in automatic transfer media and/or product alignment, orientation, and registration. Non-contact sensors within the scope of the invention include, but are not limited to, optical sensors, proximity sensors, or digital cameras, which may be mounted on any or all of transport mechanism 6, end effector 8, and substrate 10. For example, sensors 1102 may comprise light sources configured to provide through-beams of visible, infrared, or laser light that may indicate to an operator if the transfer media is properly aligned and registered on substrate 10. The indication may occur visually on substrate 10 or a nearby structure itself (for example, red and green LED lights, with the green light illuminating when the transfer media is properly aligned or past a certain location within the apparatus), or may be transmitted to a user interface device and presented in a graphical user interface.

Non-contact sensors 1102 may be associated with one or more control units that control the motion of transport mechanism 6 and/or end effector 8, and may form part of an integrated, automated alignment system. For example, in some embodiments transport mechanism 6 may be configured to transport and align a sheet of printed transfer media from tray 4 to substrate 10. When configured to include non-contact sensors 1102, apparatus 100 may be configured to control the extent of movement of transport mechanism 6. As described above, sensors 1102 may be configured to sense that the transfer media has passed over them, such as by breaking a through-beam, by sensing a change in optical clarity, or by a visual confirmation if sensors 1102 are configured to include a digital camera. When sensors 1102 are triggered, they may signal to the control unit controlling transport mechanism 6 and/or end effector 8 to immediately cease further forward motion of the transfer media onto the substrate. Sensors 1102 may be further configured to detect misalignment of the transfer media. For example, if the transfer media is placed on substrate 10 at a slight angle, sensors 1102 may be able to detect the error in the media placement and either signal to the control unit controlling transport mechanism 6 to take corrective measures, or signal to other software components to account for the misplacement during further operation of the apparatus.

In other embodiments, substrate 10 may be disposed relative to tray 4 such that a series of mechanical guides assist in the placement of the transfer media. For example, tray 4 may be configured to form a funnel shape, such that the transfer media can only approach substrate 10 in a predetermined manner. Substrate 10 may be fitted with guide rails or other such stationary mechanical implements to position and align the transfer media and/or products, such as mechanical implements 1106. Such mechanical implements may be disposed under the immediate surface of substrate 10, and may be situated in holes or divots in substrate 10. In some embodiments, mechanical implements 1106 may be retractable, and are only visible and engaged while aligning and positioning the transfer media.

In some embodiments, implements 1106 may be configured as mechanical switches that provide guidance for orientation and alignment of the transfer media. In these embodiments, implements 1106 may serve as stops for the transfer media, such that when an edge of the media hits the switch, apparatus 100 automatically stops moving the media in that direction. In other embodiments, implements 1106 may be configured to serve as gates, and may be retractable. The transfer media may be fed or transported over top of implements 1106, then positioned in the X-Y dimension once beyond them.

The methods and apparatuses contemplated by the invention enable configuration of a dye sublimation transfer printing system to sublimate multiple products at the same time. This process may be automated by the various hardware and software components described above. Automation not only enables any and all users to operate the apparatus without risk of bodily harm or equipment damage, but also ensures the highest quality sublimation transfer.

As described above, the disclosed embodiments enable the sublimation of multiple products substantially simultaneously by determining a proper spatial arrangement for the printing of images onto the transfer media. Performing this process automatically rather than leaving placement of the products to manual approximation or judgment improves the quality of the sublimated product. Since displacement of only millimeters can create an unsightly blurred or smudged image, precise, repeatable, reliable registration of multiple products on their corresponding images facilitates customers walking away satisfied, with the clearest, sharpest images possible on their favorite customizable products. The improved methods and apparatus enabling simultaneous multiple product sublimation may positively impact the bottom line of a host retail establishment in at least three ways. Perhaps the most obvious benefits are the increased variety of product and/or pricing offerings that the retailer can offer to customers. Furthermore, the methods of the invention facilitate production of a much greater number of sublimated products in a given time period. This time savings can translate directly into extra money for the hosting establishment. Simultaneous multiple article sublimation also may have more indirect benefits that still result in savings to a retail establishment. For example, the apparatus as configured may be significantly more energy efficient, as the mechanical and electrical components need to be operated for only a fraction of the time to produce the same number of products as a traditional system that can only sublimate one item at a time. By the same token, an apparatus capable of producing multiple sublimated products with each and every thermal cycle consequently will also see less wear on the machine components and perhaps require less service over the life of the machine. Taken together, these factors suggest that the methods and apparatus of the invention present an attractive market opportunity for a retailer looking to expand profits in a tight economic climate.

Figure 7:
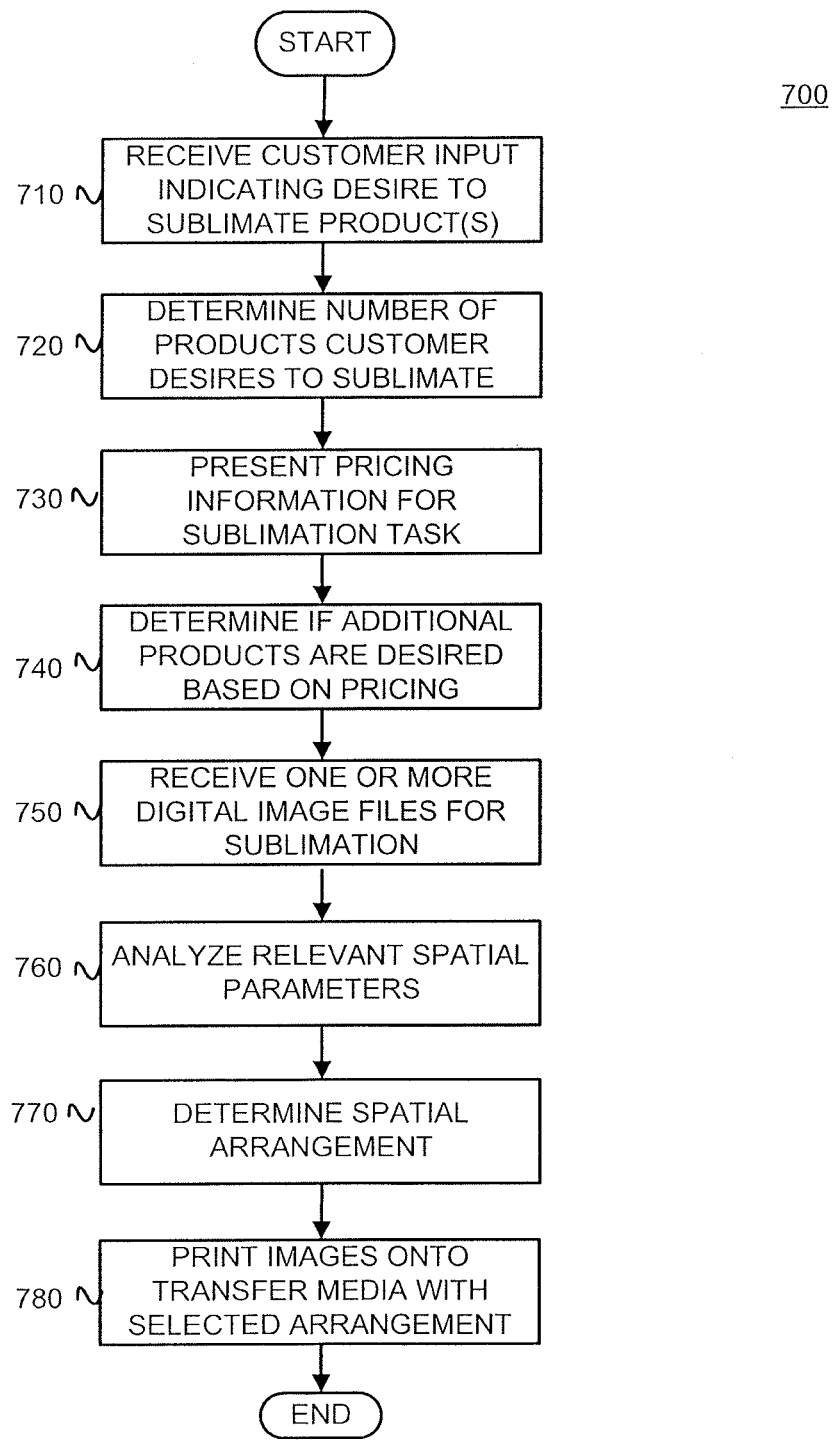
FIG. 7 is a flowchart of an exemplary spatial arrangement determination process, consistent with disclosed embodiments.
Figure 8:
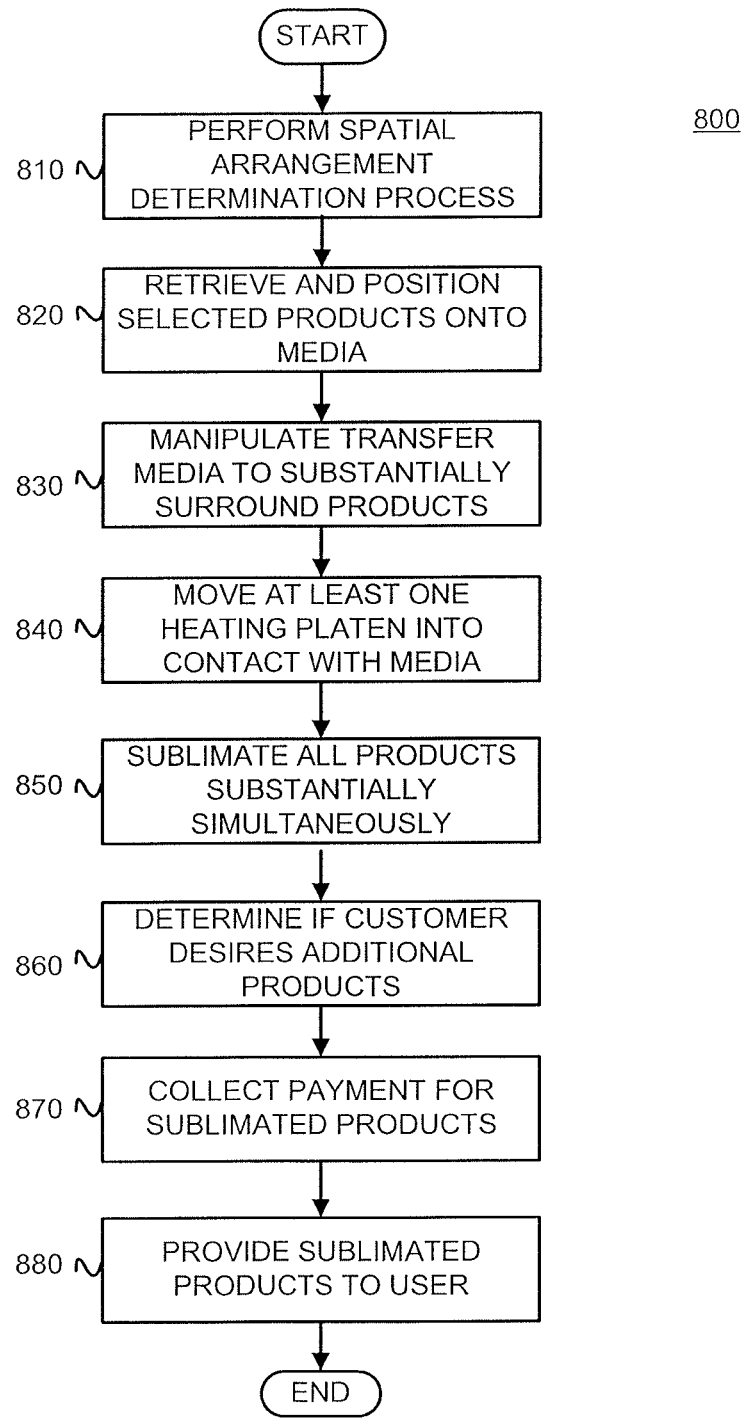
FIG. 8 is a flowchart of an exemplary dye sublimation transfer printing process, consistent with disclosed embodiments.

Other embodiments of the invention will be apparent to those skilled in the art from consideration of the specification and practice of the invention disclosed herein. For example, the processes of FIGS. 7, 8, and 10 are not limited to the sequences described above. Variations of these sequences, such as the removal and/or the addition of other process steps may be implemented without departing from the spirit and scope of the disclosed embodiments. It is intended that the specification and examples be considered as examples only, with a true scope and spirit of the invention being indicated by the following claims.

What is claimed is:

1. A computer-implemented automated method for simultaneously sublimating images on two or more products using a dye sublimation transfer printer apparatus including an interface device containing one or more processors, comprising:
   prompting the user, via the interface device, to indicate a desired number of products to sublimate;
   receiving, via the interface device, one or more digital image files representing an image selected by the user for sublimating onto the products;
   presenting to the user, via the interface device, information relating to pricing of the desired products;
   determining, via the one or more processors, a spatial arrangement of the images on a transfer media based upon the user's desired number of products to be sublimated;
   printing the images onto the transfer media, wherein the images are printed onto the media according to the determined spatial arrangement;
   positioning the transfer media on a substrate;
   positioning the desired number of products onto the transfer media in a manner corresponding to the determined spatial arrangement;
   configuring, via the one or more processors, a single thermal cycle for one or more heating platens such that the images will be sublimated substantially simultaneously onto each one of the desired number of products in a single thermal cycle;
   moving the one or more heating platens into contact with the transfer media; and
   sublimating at least one image from the transfer media onto each of the desired number of products using the configured single thermal cycle of the one or more heating platens.

2. The method of claim 1, wherein the information relating to pricing of the desired products includes information pertaining to a discounted unit price when an increased quantity of products are purchased.

3. The method of claim 1, wherein determining the spatial arrangement constitutes determining an arrangement of the images on the transfer media such that the images are substantially symmetrical about at least one axis of the transfer media.

4. The method of claim 1, wherein the interface device includes a memory storing a lookup table, and determining the spatial arrangement constitutes inputting the type and number of products to be sublimated into the lookup table and printing the images onto the transfer media based on a spatial arrangement stored in the lookup table for the given inputs.

5. The method of claim 1, wherein the same selected image is sublimated onto each of the desired products.

6. The method of claim 1, wherein at least one of the desired products is sublimated with an image different from an image sublimated onto another one of the desired products.

7. The method of claim 1, wherein at least one of the desired products is a different shape than another one of the desired products.

8. The method of claim 7, wherein the differently-shaped products are comprised of the same material and have the same thickness.

9. The method of claim 1, further comprising manipulating the transfer media to substantially surround each of the desired products, wherein at least one printed image is positioned on each side of each desired product.

10. The method of claim 1, further comprising capturing an image of the positioned products with a camera and visually confirming that the desired number of products are correctly positioned on the transfer media.

11. The method of claim 1, further comprising coordinating and receiving payment for the printed product via the interface device.

12. The method of claim 11, wherein the interface device is configured to receive payment prior to sublimating the desired number of products, but is further configured to not complete the transaction until the user is prompted, via the user interface device, if more products are desired to be sublimated.

13. The method of claim 1, further comprising providing the desired number of products to the user, wherein the desired products are not provided at least until the products are cooled to at least about an ambient temperature or until the interface device collects payment for the products.

14. The method of claim 1, wherein determining a spatial arrangement of the images further comprises determining an arrangement to sublimate as many of the user's desired number of products as possible in a single thermal cycle.

15. The method of claim 14, wherein if all of the user's desired number of products cannot be sublimated in a single thermal cycle, the interface device is configured to notify the user that additional thermal cycles will be necessary.

16. The method of claim 15, wherein the interface device is configured to coordinate execution of the additional thermal cycles on a remote apparatus.

17. The method of claim 1, further comprising printing a set of two or more fiducial markers on the transfer media.

18. The method of claim 17, wherein positioning the transfer media on the substrate includes determining coordinate positions of the set of fiducial markers relative to coordinate positions of one or more reference points associated with the substrate.

19. The method of claim 18, further comprising determining an error measurement for the transfer media position based on variations in the coordinate positions of the set of fiducial markers relative to coordinate positions of one or more reference points associated with the substrate.

20. The method of claim 19, further comprising automatically calibrating one or more components of the apparatus based on the determined error measurement.

21. The method of claim 1, wherein positioning the desired number of products onto the transfer media comprises aligning a virtual reference point of each one of the desired number of products with a virtual reference point of one of the images printed onto the transfer media using software.

22. The method of claim 19, wherein positioning the desired number of products onto the transfer media comprises aligning a virtual reference point of each one of the desired number of products with a virtual reference point of one of the images printed onto the transfer media using software while accounting for the error measurement.

23. The method of claim 1, wherein the digital image files are captured by a camera associated with the interface device.

24. The method of claim 23, wherein the interface device contains a plurality of stock digital image files for selection by the customer and the printed images include a selected stock image and an image captured by the camera.

25. The method of claim 24, wherein the interface device is configured to superimpose one or more of the images received from the customer onto one or more of the plurality of stock images and print the superimposed image onto the transfer media.

26. The method of claim 24, wherein the plurality of stock image files are separated into categories within the interface device.

27. The method of claim 26, wherein the categories include at least one of a holiday, a season, and a geographic location.

28. The method of claim 26, wherein pricing information for printing a stock image file onto the desired products varies based on the category.

29. The method of claim 1, wherein configuring a single thermal cycle comprises configuring at least one of a programmed temperature, duration, linear distance traveled by the one or more heating platens, and pressure.

30. The method of claim 29, wherein configuring a programmed duration of the single thermal cycle comprises determining a duration sufficient to achieve a sublimation temperature at the surface of each side of each of the desired number of products to be sublimated.

31. An apparatus for sublimating images onto multiple products for a user in a retail environment, comprising:
a user interface device including one or more processors configured to receive one or more digital image files representing one or more images, wherein the user interface is configured to determine a spatial arrangement of the images on a transfer media based upon the user's desired number of products to be sublimated;
a dye sublimation transfer printer configured to print the images on the transfer media according to the determined spatial arrangement;
a substrate configured to receive the transfer media from the printer;
a transport mechanism configured to position the multiple products onto the transfer media and manipulate the transfer media to substantially surround the multiple products, wherein at least one printed image is positioned onto at least one side of each of the multiple products to be sublimated;
one or more heating platens configured to engage the transfer media, and a control unit for configuring a single thermal cycle for the one or more heating platens such that the images will be sublimated substantially simultaneously onto each of the multiple products in a single thermal cycle.

32. The apparatus of claim 31, wherein the control unit is configured to set at least one of a programmed temperature, duration, linear distance traveled by the one or more heating platens, and pressure for the single thermal cycle.

33. The apparatus of claim 32, wherein the control unit sets a programmed duration of the single thermal cycle by determining a duration sufficient to achieve a sublimation temperature at the surface of each side of each of the desired number of products to be sublimated.

34. The apparatus of claim 31, wherein the user interface device is configured to present information relating to pricing of the desired products to the user for review and then collect payment for the products.

35. The apparatus of claim 31, wherein the apparatus includes a camera configured to capture an image of the positioned products and visually confirm that the desired number of products are correctly positioned on the transfer media.

36. A computer-implemented automated method for simultaneously sublimating images on two or more products using a dye sublimation transfer printer apparatus including an interface device containing one or more processors, comprising:
prompting the user, via the interface device, to indicate a desired number of products to sublimate;
receiving, via the interface device, one or more digital image files representing an image selected by the user for sublimating onto the products;
presenting to the user, via the interface device, information relating to pricing of the desired products;
determining, via the one or more processors, a spatial arrangement of the images on a transfer media based upon the user's desired number of products to be sublimated;
printing the images onto the transfer media, wherein the images are printed onto the media according to the determined spatial arrangement;
positioning the transfer media on a substrate;
positioning the desired number of products onto the transfer media in a manner corresponding to the determined spatial arrangement;
configuring, via the one or more processors, a single thermal cycle for one or more heating platens such that the images will be sublimated substantially simultaneously onto each one of the desired number of products in a single thermal cycle;
engaging the transfer media with the one or more heating platens; and
sublimating at least one image from the transfer media onto each of the desired number of products using the configured single thermal cycle of the one or more heating platens.

37. The method of claim 36, wherein determining the spatial arrangement constitutes determining an arrangement of the images on the transfer media such that the images are substantially symmetrical about at least one axis of the transfer media.

38. The method of claim 36, wherein the interface device includes a memory storing a lookup table, and determining the spatial arrangement constitutes inputting the type and number of products to be sublimated into the lookup table and printing the images onto the transfer media based on a spatial arrangement stored in the lookup table for the given inputs.

39. The method of claim 36, wherein engaging the transfer media with the one or more heating platens comprises moving the one or more heating platens into contact with the transfer media.

* * * * *